United States Patent
Gibbs et al.

(10) Patent No.: US 8,515,954 B2
(45) Date of Patent: *Aug. 20, 2013

(54) DISPLAYING AUTOCOMPLETION OF PARTIAL SEARCH QUERY WITH PREDICTED SEARCH RESULTS

(75) Inventors: Kevin A. Gibbs, San Francisco, CA (US); Sepandar D. Karnvar, Palo Alto, CA (US); Taher H. Haveliwala, Mountain View, CA (US); Glen M. Jeh, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/218,416

(22) Filed: Aug. 25, 2011

(65) Prior Publication Data
US 2011/0314021 A1     Dec. 22, 2011

Related U.S. Application Data

(63) Continuation of application No. 12/345,564, filed on Dec. 29, 2008, which is a continuation of application No. 10/987,295, filed on Nov. 11, 2004, now Pat. No. 7,487,145, and a continuation-in-part of application No. 10/875,143, filed on Jun. 22, 2004, now Pat. No. 7,836,044.

(51) Int. Cl.
*G06F 17/30* (2006.01)
(52) U.S. Cl.
USPC ............................... 707/732; 707/758
(58) Field of Classification Search
USPC ....... 707/758, 732, 999.01, 999.006, 999.107
See application file for complete search history.

(56) References Cited

U.S. PATENT DOCUMENTS

| 5,649,222 A | 7/1997 | Mogilevsky |
| 5,687,364 A | 11/1997 | Saund et al. |

(Continued)

FOREIGN PATENT DOCUMENTS

| CN | 1670723 A | 9/2005 |
| EP | 1359516 | 11/2003 |

(Continued)

OTHER PUBLICATIONS

International Search Report for International Application No. PCT/US2005/036553, mailed May 11, 2006.

(Continued)

*Primary Examiner* — Leslie Wong
(74) *Attorney, Agent, or Firm* — Morgan, Lewis & Bockius LLP

(57) ABSTRACT

A set of ordered predicted completion strings are presented to a user as the user enters text in a text entry box (e.g., a browser or a toolbar). The predicted completion strings can be in the form of URLs or query strings. The ordering may be based on any number of factors (e.g., a query's frequency of submission from a community of users). URLs can be ranked based on an importance value of the URL. Privacy is taken into account in a number of ways, such as using a previously submitted query only when more than a certain number of unique requestors have made the query. The sets of ordered predicted completion strings is obtained by matching a fingerprint value of the user's entry string to a fingerprint to table map which contains the set of ordered predicted completion strings.

24 Claims, 13 Drawing Sheets

(56) References Cited

U.S. PATENT DOCUMENTS

| | | |
|---|---|---|
| 5,761,436 A | 6/1998 | Nielsen |
| 5,805,911 A | 9/1998 | Miller |
| 5,845,300 A | 12/1998 | Comer et al. |
| 5,873,107 A | 2/1999 | Borovoy et al. |
| 5,892,919 A | 4/1999 | Nielsen |
| 5,907,680 A | 5/1999 | Nielsen |
| 5,920,854 A | 7/1999 | Kirsch et al. |
| 5,954,798 A | 9/1999 | Shelton et al. |
| 5,995,928 A | 11/1999 | Nguyen et al. |
| 6,006,225 A | 12/1999 | Bowman et al. |
| 6,032,162 A | 2/2000 | Burke |
| 6,037,934 A | 3/2000 | Himmel et al. |
| 6,041,360 A | 3/2000 | Himmel et al. |
| 6,067,565 A | 5/2000 | Horvitz |
| 6,096,096 A | 8/2000 | Murphy et al. |
| 6,125,361 A | 9/2000 | Chakrabarti et al. |
| 6,144,958 A | 11/2000 | Ortega et al. |
| 6,199,986 B1 | 3/2001 | Williams et al. |
| 6,243,071 B1 | 6/2001 | Shwarts et al. |
| 6,278,449 B1 | 8/2001 | Sugiarto et al. |
| 6,281,886 B1 | 8/2001 | Ranieri |
| 6,321,228 B1 | 11/2001 | Crandall et al. |
| 6,324,566 B1 | 11/2001 | Himmel et al. |
| 6,356,908 B1 | 3/2002 | Brown et al. |
| 6,377,965 B1* | 4/2002 | Hachamovitch et al. ..... 715/203 |
| 6,393,389 B1 | 5/2002 | Chanod et al. |
| 6,411,948 B1 | 6/2002 | Hetherington et al. |
| 6,493,702 B1 | 12/2002 | Adar et al. |
| 6,546,388 B1 | 4/2003 | Edlund et al. |
| 6,546,393 B1 | 4/2003 | Khan |
| 6,564,213 B1* | 5/2003 | Ortega et al. ..................... 1/1 |
| 6,598,051 B1 | 7/2003 | Wiener et al. |
| 6,631,496 B1 | 10/2003 | Li et al. |
| 6,647,383 B1 | 11/2003 | August et al. |
| 6,687,689 B1 | 2/2004 | Fung et al. |
| 6,704,727 B1 | 3/2004 | Kravets |
| 6,708,250 B2 | 3/2004 | Gillingham |
| 6,735,592 B1 | 5/2004 | Neumann et al. |
| 6,751,606 B1 | 6/2004 | Fries et al. |
| 6,778,979 B2 | 8/2004 | Grefenstette et al. |
| 6,819,336 B1 | 11/2004 | Nielsen |
| 6,832,218 B1 | 12/2004 | Emens et al. |
| 6,876,997 B1 | 4/2005 | Rorex et al. |
| 6,956,968 B1 | 10/2005 | O'Dell et al. |
| 7,031,961 B2 | 4/2006 | Pitkow et al. |
| 7,111,000 B2 | 9/2006 | Wen et al. |
| 7,124,129 B2 | 10/2006 | Bowman et al. |
| 7,149,970 B1 | 12/2006 | Pratley et al. |
| 7,152,064 B2 | 12/2006 | Bourdoncle et al. |
| 7,181,438 B1 | 2/2007 | Szabo |
| 7,181,447 B2 | 2/2007 | Curtis et al. |
| 7,188,304 B2 | 3/2007 | Morimoto et al. |
| 7,216,290 B2 | 5/2007 | Goldstein et al. |
| 7,293,231 B1 | 11/2007 | Gunn et al. |
| 7,467,131 B1 | 12/2008 | Gharachorloo et al. |
| 7,660,815 B1 | 2/2010 | Scofield et al. |
| 7,752,326 B2 | 7/2010 | Smit |
| 7,801,896 B2 | 9/2010 | Szabo |
| 7,844,590 B1 | 11/2010 | Zwicky et al. |
| 7,890,526 B1 | 2/2011 | Brewer et al. |
| 7,941,762 B1* | 5/2011 | Tovino et al. ................. 715/816 |
| 8,060,639 B2 | 11/2011 | Smit et al. |
| 8,112,529 B2 | 2/2012 | van der Oord et al. |
| 2001/0047355 A1 | 11/2001 | Anwar |
| 2002/0023145 A1 | 2/2002 | Orr et al. |
| 2002/0078045 A1 | 6/2002 | Dutta |
| 2002/0174145 A1 | 11/2002 | Duga et al. |
| 2002/0187815 A1 | 12/2002 | Deeds et al. |
| 2003/0023582 A1 | 1/2003 | Bates et al. |
| 2003/0037050 A1 | 2/2003 | Monteverde |
| 2003/0041147 A1* | 2/2003 | van den Oord et al. ....... 709/227 |
| 2003/0135725 A1 | 7/2003 | Schirmer et al. |
| 2003/0143979 A1 | 7/2003 | Suzuki et al. |
| 2003/0145087 A1 | 7/2003 | Keller et al. |
| 2003/0212563 A1 | 11/2003 | Ju et al. |
| 2003/0220913 A1 | 11/2003 | Doganata et al. |
| 2004/0010520 A1 | 1/2004 | Tsang et al. |
| 2004/0064577 A1 | 4/2004 | Dahlin et al. |
| 2004/0205501 A1 | 10/2004 | Gupta |
| 2004/0230574 A1 | 11/2004 | Kravets |
| 2004/0254928 A1 | 12/2004 | Vronay et al. |
| 2005/0080771 A1 | 4/2005 | Fish |
| 2005/0149507 A1 | 7/2005 | Nye |
| 2005/0203878 A1 | 9/2005 | Brill et al. |
| 2005/0210383 A1 | 9/2005 | Cucerzan et al. |
| 2005/0246211 A1 | 11/2005 | Kaiser |
| 2005/0283468 A1 | 12/2005 | Kamvar et al. |
| 2006/0106769 A1 | 5/2006 | Gibbs |
| 2006/0224871 A1 | 10/2006 | Tran |
| 2006/0259479 A1 | 11/2006 | Dai |
| 2007/0050352 A1 | 3/2007 | Kim |
| 2007/0100890 A1 | 5/2007 | Kim |
| 2007/0156677 A1 | 7/2007 | Szabo |
| 2008/0040323 A1 | 2/2008 | Joshi |
| 2008/0201227 A1 | 8/2008 | Bakewell et al. |
| 2009/0119289 A1 | 5/2009 | Gibbs et al. |
| 2011/0258183 A1 | 10/2011 | Gibbs et al. |
| 2011/0271095 A1 | 11/2011 | Bharat et al. |
| 2011/0314021 A1 | 12/2011 | Gibbs et al. |

FOREIGN PATENT DOCUMENTS

| | | |
|---|---|---|
| JP | 2001/249933 A | 9/2001 |
| WO | WO 00/57265 | 9/2000 |
| WO | WO 2005/033967 | 4/2005 |

OTHER PUBLICATIONS

International Search Report for International Application PCT/US2009/048668, mailed Jan. 27, 2010, 12 pages.

Office Action dated Jun. 5, 2009 for related U.S. Appl. No. 10/987,769, 33 pages.

Anick, *The Paraphrase Search Assistant: Terminological Feedback for Iterative Information Seeking*, SIGIR'99, Berkeley, CA, Aug. 1999, pp. 153-159.

Cruz, *A User Interface for Distributed Multimedia Database Querying with Mediator Supported Refinement*, Department of Computer Science—ADVIS Research Group, Worcester Polytechnic Institute, Worcester, MA, Aug. 1999, 9 pages.

Hoong, *Guided Google: A Meta Search Engine and its Implementation using the Google Distributed Web Services*, Grid Computing and Distributed Systems (GRIDS) Laboratory, Department of Computer Science and Software Engineering, The University of Melbourne, Australia, Feb. 13, 2003, 8 pages.

International Preliminary Report on Patentability, PCT/US2006/062651, Jul. 1, 2008, 7 pages.

International Search Report and Written Opinion, PCT/US2006/062651, Mar. 21, 2007, 11 pages.

Koester, *Conceptual Knowledge Processing with Google*, Proceedings of the LWA 2005, Saarbrucken, Germany, Oct. 2005, 6 pages.

Penas, *Browsing by Phrases: Terminological Information in Interactive Multilingual Text Retrieval*, JCDL'01, Roanoke, VA, Jun. 24-28, 2001, pp. 253-254.

Richardson, *Mac User Makes Auto Complete Search Function for Safari*, WebProNews, Jul. 19, 2005, 2 pages.

Varghese, *Google Suggest comes online*, The Sydney Morning Herald, Dec. 15, 2004, 1 page.

Watanabe, *DWBlog—Inquisitor 1.0*, www.newsfirex.com/blog/?p-47, Jun. 28, 2010, 4 pages.

Google Web Help. Jun. 17, 2010, 2 pgs. http://www.google.com/support/websearch/bin/answer.py?answer=106230.

Kolvenbach, "A Toolbar for Efficient Interaction in Online Communities," IEEE Computer Society, 2005, 8 pgs.

Lam, "Automatic Text Categorization and Its application to Text Retrieval," IEEE Transactions on Knowledge and Data Engineering, vol. 11, No. 5, Nov./Dec. 1999, pp. 865-879.

International Search Report and Written Opinion, PCT/US2008/072678, Apr. 9, 2009, 10 pages.

Google Inc., Chinese Patent Application 200880110208.1, Office Action dated Jul. 26, 2011, 10 pages.

Google Inc., Japanese Patent Application 2007-541185, Office Action dated Nov. 2, 2011, 2 pages.
Gery, Evaluation of Web Usage Mining Approaches for User's Next Request Prediction, WIDM '03, Nov. 7-8, 2003, pp. 74-81.
Lempel, Predictive Caching and Prefetching of Query Results in Search Engines, WWW2003, May 20-24, 2003, 10 pgs.
Wang, An Approach Toward Web Caching and Prefetching for Database Management System, 2001, 9 pgs.
Anick, The Paraphrase Search Assistant: Terminological Feedback for Iterative Information Seeking, 1999, 7 Pgs.
Cruz, A User Interface for Distributed Multimedia Database Querying with Mediator Supported Refinement, IDEAS '99, Aug. 2-4, 1999, pg. 9.
Djabarov, Amendment After Final, U.S. Appl. No. 11/321,075, Oct. 7, 2010, 30 pgs.
Djabarov, Amendment After Final, U.S. Appl. No. 11/321,075, Jun. 25, 2009, 51 pgs.
Djabarov, Amendment, U.S. Appl. No. 11/321,075, Feb. 12, 2009, 39 pgs.
Djabarov, Amendment, U.S. Appl. No. 11/321,075, Mar. 25, 2010, 40 pgs.
Djabarov, Amendment, U.S. Appl. No. 11/321,075, Jul. 30, 2008, 45 pgs.
Gery, Evaluation of web usage mining approaches for user's next request prediction, Nov. 2003, 8 pgs.
Gibbs, Amendment After Allowance, U.S. Appl. No. 13/243,668, May 31, 2012, 7 pgs.
Gibbs, Amendment, U.S. Appl. No. 10/987,294, Aug. 6, 2007, 20 pgs.
Gibbs, Amendment, U.S. Appl. No. 10/987,295, Aug. 6, 2007, 21 pgs.
Gibbs, Amendment, U.S. Appl. No. 10/987,769, Sep. 8, 2009, 19 pgs.
Gibbs, Amendment, U.S. Appl. No. 10/987,769, Aug. 21, 2008, 23 pgs.
Gibbs, Amendment, U.S. Appl. No. 12/345,564, Apr. 18, 2011, 16 pgs.
Gibbs, Amendment, U.S. Appl. No. 12/360,076, Mar. 28, 2010, 8 pgs.
Gibbs, Amendment, U.S. Appl. No. 13/167,591, Feb. 22, 2012, 11 pgs.
Gibbs, Appellant's Brief, U.S. Appl. No. 10/987,769, Jun. 28, 2010, 37 pgs.
Gibbs, Appellant's Brief, U.S. Appl. No. 12/345,564, Oct. 31, 2011, 24 pgs.
Gibbs, Appellant's Reply Brief, U.S. Appl. No. 12/345,564, Feb. 16, 2012, 13 pgs.
Gibbs, Reply Brief, U.S. Appl. No. 10/987,769, Nov. 16, 2010, 9 pgs.
Gibbs, Response to Final OA, U.S. Appl. No. 10/987,294, Jan. 14, 2008, 11 pgs.
Gibbs, Response to Final OA, U.S. Appl. No. 10/987,295, May 12, 2008, 13 pgs.
Gibbs, Response to Final OA, U.S. Appl. No. 10/987,295, Jan. 14, 2008, 13 pgs.
Gibbs, Response to Final OA, U.S. Appl. No. 10/987,769, Mar. 1, 2010, 19 pgs.
Gibbs, Response to Final OA, U.S. Appl. No. 10/987,769, Mar. 26, 2009, 22 pgs.
Gibbs, Response to Final OA, U.S. Appl. No. 12/345,564, Aug. 1, 2011, 13 pgs.
Gibbs, Response to Office Action, U.S. Appl. No. 10/987,294, Sep. 12, 2008, 17 pgs.
Gibbs, Response to Office Action, U.S. Appl. No. 10/987,295, Sep. 12, 2008, 15 pgs.
Gibbs, Supplemental Response to Final OA, U.S. Appl. No. 10/987,294, May 12, 2008, 13 pgs.
Gibbs, Supplemental Response to Final OA, U.S. Appl. No. 12/345,564, Aug. 5, 2011, 13 pgs.
Gibbs, Supplemental Response to Final OA, U.S. Appl. No. 10/987,769, Mar. 23, 2010, 17 pgs.
Google Inc., IPRP, PCT/US2006/062651, Jul. 1, 2008, 7 pgs.
Google Inc., International Search Report, PCT/US2006/062651, Mar. 21, 2007, 11 pgs.
Google Inc., International Search Report/Written Opinion, PCT/US2005/036553, May 11, 2006, 4 pgs.
Google Inc., International Search Report/Written Opinion, PCT/US2008/072678, Apr. 9, 2009, 10 pgs.
Google Inc., International Search Report/Written Opinion, PCT/US2009/048668, Jan. 27, 2010, 12 pgs.
Google Inc., Notice to File a Response, KR 2007-7013174, Jun. 1, 2012, 6 pgs.
Google Inc., Office Action, CN 200880110208.1, Jul. 26, 2011, 10 pgs.
Google Inc., Office Action, Japanese Patent Application 2007-541185, Nov. 2, 2011, 2 pgs.
Google Web Help—Google Suggest, 2010, 2 pgs.
Hoong, Guided Google: A Meta Search Engine and Its Implementation Using the Google Distributed Web Services 1999, 8 pgs.
Kamvar, Amendment, U.S. Appl. No. 10/875,143, Jan. 9, 2008, 11 pgs.
Kamvar, Amendment, U.S. Appl. No. 10/875,143, Aug. 28, 2008, 12 pgs.
Kamvar, Amendment, U.S. Appl. No. 12/916,330, Oct. 4, 2011, 7 pgs.
Kamvar, Amendment, U.S. Appl. No. 13/245,701, Apr. 23, 2012, 7 pgs.
Kamvar, Office Action, U.S. Appl. No. 13/402,835, Oct. 10, 2012, 24 pgs.
Kamvar, Office Action, U.S. Appl. No. 13/402,840, Oct. 10, 2012, 22 pgs.
Kamvar, Preliminary Amendment, U.S. Appl. No. 12/916,330, Apr. 22, 2011, 6 pgs.
Kamvar, Response to Final Office Action, U.S. Appl. No. 10/875,143, Mar. 9, 2009, 11 pgs
Kamvar, Response to Office Action, U.S. Appl. No. 10/875,143, Sep. 22, 2009, 13 pgs.
Kamvar, Response to Office Action, U.S. Appl. No. 10/875,143, Mar. 29, 2010, 16 pgs.
Kamvar, Supplemental Amendment, U.S. Appl. No. 10/875,143, Apr. 8, 2009, 10 pgs.
Kim, Amendment, U.S. Appl. No. 12/188,163, Jun. 17, 2011, 15 pgs.
Kim, Appellant's Brief, U.S. Appl. No. 12/188,163, Apr. 9, 2012, 34 pgs.
Kim, Response to Final OA, U.S. Appl. No. 12/188,163, Jan. 6, 2012, 12 pgs.
Koester, Conceptual Knowledge Processing with Google, 2005, 6 pages.
Kolvenbach, A Toolbar for Efficient Interaction in Online Communities, 2005, 8 pgs.
Lam, Automatic Text Categorization and Its Application to Text Retrieval, 1999, 15 pgs.
Lempel, Predictive caching and prefetching of query results in search engines, May 2003, 10 pgs.
Partial and full URLs, mapls.fsl.noaa.gov/moniger/ web101/1-lecture/partial.html, 1996, 1 pgs.
Penas, Browsing by phrases: terminological information in interactive multilingual text retrieval, JCDL, '01, Jun. 24-28, 2001, 2pgs.
Richardson, Mac User Makes Auto Complete Search Function for Safari, Jul. 19, 2005, 2 pgs.
Varghese, Goodle Suggest Comes Online, Dec. 15, 2004, 1 pg.
Wang, An Approach Toward Web Caching and Prefetching for Database Management System, SIGMOD 2001, May 21-23, 2001, Santa Barbara, CA., 9 pgs.
Watanabe, DWBlog—Inquisitor 1.0, Jul. 18, 2005, 4 pgs.

* cited by examiner

802

| Partial Query | Complete Query | Frequency |
|---|---|---|
| <h> | <hot dog ingredients> | 100,000 |
| <ho> | <hot dog ingredients> | 100,000 |
| <hot> | <hot dog ingredients> | 100,000 |
| <hot > | <hot dog ingredients> | 100,000 |
| <hot d> | <hot dog ingredients> | 100,000 |
| ⋮ | ⋮ | ⋮ |
| <h> | <hotmail> | 300,000 |
| <ho> | <hotmail> | 300,000 |
| <hot> | <hotmail> | 300,000 |
| <hotm> | <hotmail> | 300,000 |
| ⋮ | ⋮ | ⋮ |

DISPLAYING AUTOCOMPLETION OF PARTIAL SEARCH QUERY WITH PREDICTED SEARCH RESULTS

RELATED APPLICATIONS

This application claims priority to and is a continuation of U.S. patent application Ser. No. 12/345,564, filed Dec. 29, 2008, entitled "Method and System for Autocompletion Using Ranked Results," which is a continuation of U.S. patent application Ser. No. 10/987,295, filed Nov. 11, 2004, now U.S. Pat. No. 7,487,145, titled "Method and System for Autocompletion Using Ranked Results," and is also a continuation-in-part of U.S. patent application Ser. No. 10/875,143, filed Jun. 22, 2004, now U.S. Pat. No. 7,836,044, titled "Anticipated Query Generation and Processing in a Search Engine," which applications are incorporated by reference herein in their entirety.

This application is related to U.S. application Ser. No. 13/167,591, filed Jun. 23, 2011, entitled "Autocompletion of Partial Search Query with Return of Predicted Search Results," which application is incorporated by reference herein in its entirety.

TECHNICAL FIELD

The present invention relates generally to the field of search engines for locating documents in a computer network (e.g., a distributed system of computer systems), and in particular, to a system and method for speeding up a desired search by anticipating a user's request.

BACKGROUND

Search engines provide a powerful tool for locating documents in a large database of documents, such as the documents on the World Wide Web (WWW) or the documents stored on the computers of an Intranet. The documents are located in response to a search query submitted by a user. A search query may consist of one or more search terms.

In one approach to entering queries, the user enters the query by adding successive search terms until all search terms are entered. Once the user signals that all of the search terms of the query have been entered, the query is sent to the search engine. The user may have alternative ways of signaling completion of the query by, for example, entering a return character, by pressing the enter key on a keyboard or by clicking on a "search" button on a graphical user interface. Once the query is received by the search engine, it processes the search query, searches for documents responsive to the search query, and returns a list of documents to the user.

Because the query is not sent to the search engine until the user has signaled that the query is complete, time passes while the user is finishing the full search query. It would be desirable to have a system and method of speeding up this process.

SUMMARY

In one embodiment, a system and method for processing query information includes receiving query information from a search requestor, prior to the user indicating completion of the query. From the received query information a set of predicted queries ordered in accordance with a ranking criteria is predicted. The set of ordered predicted queries is then transmitted to the search requestor.

The search requestor may select a respective query from the ordered set of predicted queries and then indicate completion of the query. A search engine processes the query to produce a set of search results. Alternately, the search requestor may continue entering query information until a complete query is entered, or until a new set of predicted queries is transmitted and presented to the search requestor.

BRIEF DESCRIPTION OF THE DRAWINGS

The aforementioned embodiment of the invention as well as additional embodiments will be more clearly understood as a result of the following detailed description of the various aspects of the invention when taken in conjunction with the drawings. Like reference numerals refer to corresponding parts throughout the several views of the drawings.

FIG. 8 depicts a portion of an exemplary table used in processing historical queries in accordance with some embodiments of the present invention.

DESCRIPTION OF EMBODIMENTS

In one embodiment of the invention, portions of a user's query are transmitted to a search engine before the user has finished entering the complete query. The search engine uses the transmitted portion of the query to predict the user's final query. These predictions are transmitted back to the user. If one of the predictions is the user's intended query, then the user can select that predicted query without having to complete entry of the query. In some embodiments, the selected query is transmitted to the search engine, which returns a set of query results corresponding to the selected query.

Figure 1:
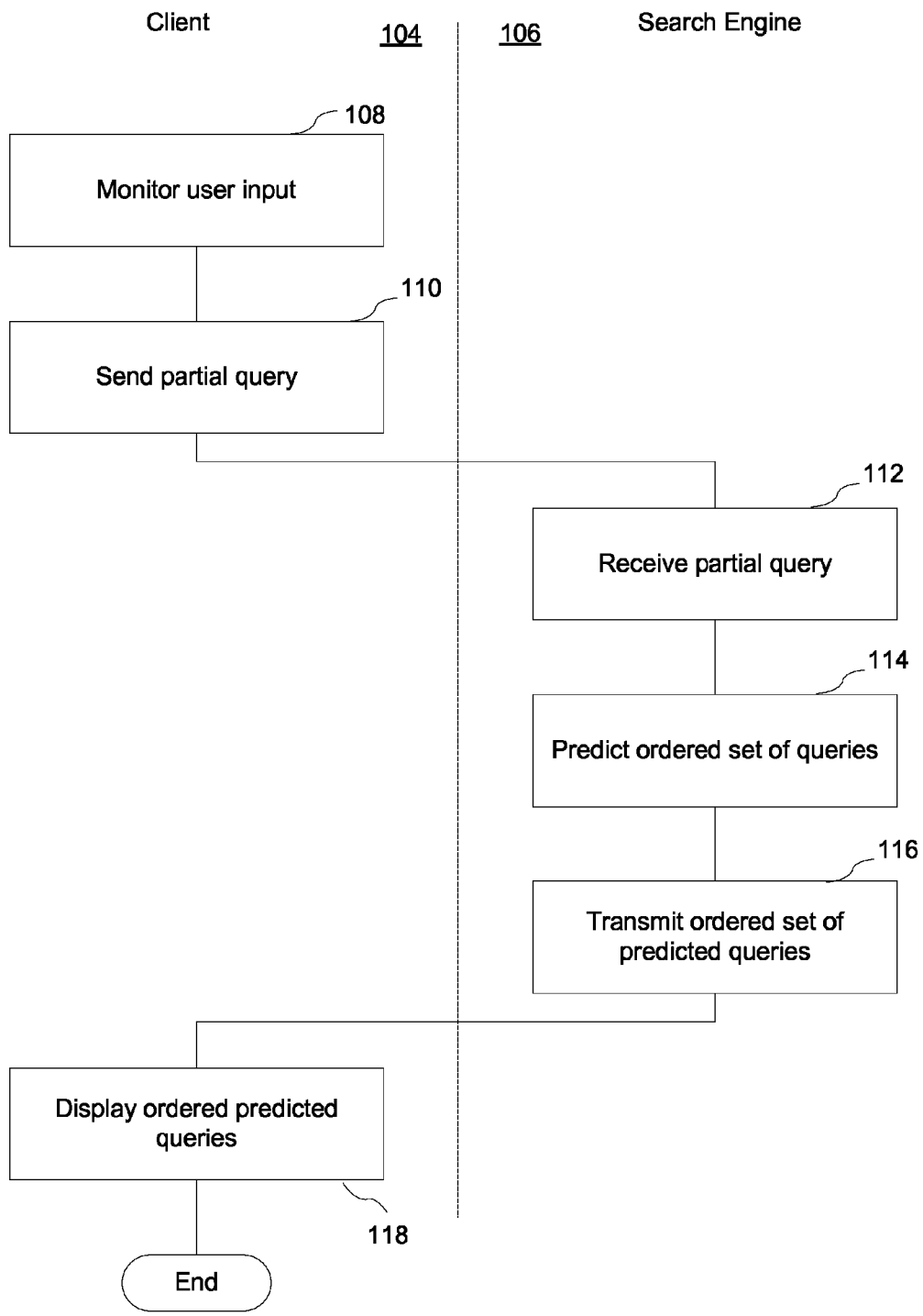
FIG. 1 depicts a process for predicting queries in accordance with some embodiments of the present invention.

FIG. 1 illustrates an exemplary embodiment of the invention including a client system 104 and a search engine 106. As a user enters a search query, the user's input is monitored by the client system (108). Prior to the user signaling completion of the search query, a portion of the user's query is sent from the client system 104 to the search engine 106 (110). The portion of the query may be a few characters, a search term, or more than one search term. In some embodiments, the partial input is in the form of a content location identifier, often called a uniform resource locator (URL) such as that described in RFC 1738, promulgated by the Internet Engineering Task Force, which can be used to identify resources within computers and computer networks. URLs can also be used to identify resources available locally on a computer such as documents, folders or services. The term "URL" is used herein to mean any form of content location identifier, including but not limited to Internet addresses, RFC 1738 compliant addresses, and file pathnames such as those use in many computer systems and local area networks. The search engine 106 receives the partial query for processing (112) and makes predictions as to user's contemplated complete query (or URL) (114). The predictions are ordered according in accordance with a ranking criteria. For example, in some embodiments queries having a higher frequency of submission are ordered before queries having lower frequencies of submission. The search engine 106 uses a number of query completion tables (described in more detail below) to assist in making the ordered predictions. The query completion tables are created using previously entered search queries received by the search engine 106. In some embodiments, the previous queries include search queries from a community of users. The predicted queries are sent back to the client system 106 (116) and then presented to the user (118). If one of the predicted queries is what the user intended as the desired query, the user may select this predicted query and proceed without having to finish entering the desired query. If the predicted queries do not reflect what the user had in mind, then the user may continue entering the desired search query.

Figure 2:
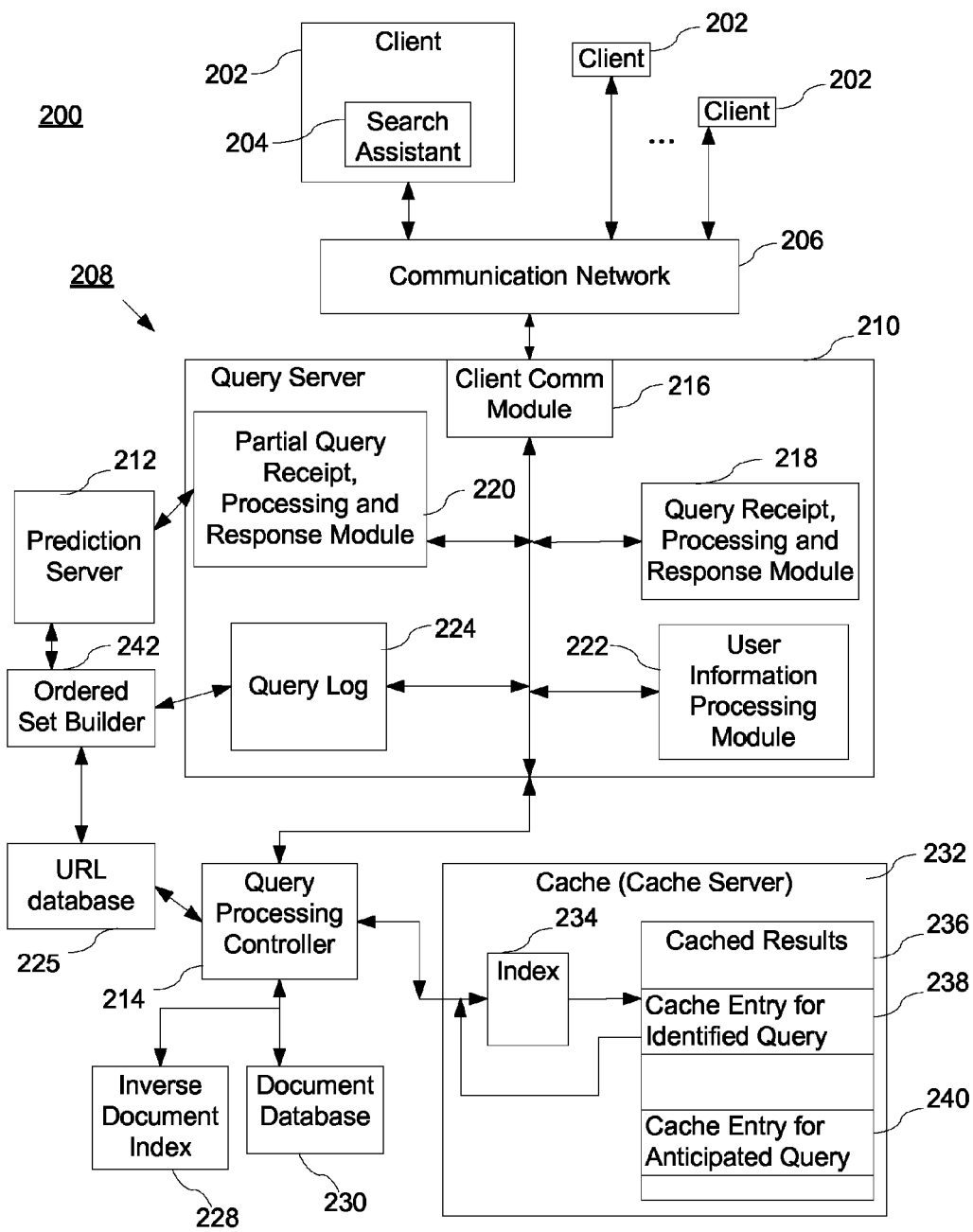
FIG. 2 depicts a block diagram of a search system in accordance with some embodiments of the present invention.

FIG. 2 illustrates a searching system 200 according to some embodiments of the invention and shows various functional components which will be referred to in the detailed discussion which follows. The search system 200 may include one or more client systems 202. Each client system 202 has a search assistant 204. The client systems 202 are connected to a communications network 206. The communications network 206 connects the client systems 202 to a search engine 208. Search engine 208 includes a query server 210 connected to the communications network 206, a prediction server 212 and a query processing controller 214.

The query server 210 includes a client communications module 216, a query receipt, processing and response module 218, a partial query receipt, processing and response module 220, a user information processing module 222, and a query log 224, all interconnected. In some embodiments, fewer and/or additional modules or functions are included in the query server 210. The modules shown in FIG. 2 as being part of query server 210 represent functions performed in an exemplary embodiment. The prediction server 212 is connected to partial query receipt, processing and response module 220, the ordered set builder 242 and to query log 224. The ordered set builder 242 creates sets of ordered predicted queries from logs of queries and URL requests, and is connected to the query log 224. In some embodiments, the ordered set builder 242 is also coupled to a URL database 225. In such embodiments, the prediction server 212 is connected directly to the query log 224 and the URL database 225.

The query processing controller 214 is connected to an inverse document index 228, a document database 230, a query cache 232 and the URL database 225. The cache 232 may include an index 234 the function of which is to locate entries in the cached results 236. The cached results 236 may include a cache entry for an identified query 238 and a cache entry for an anticipated query 240. The inverse document index 228 and document database 230 are sometimes collectively called the document database. In some embodiments, "searching the document database" means searching the inverse document index 228 to identify documents matching a specified search query or term.

Although illustrated as discrete blocks in the figure, FIG. 2 is intended more as a functional description of an embodiment of the invention rather than a structural mapping of the functional elements. One of ordinary skill in the art would recognize that an actual implementation might have the functional elements grouped or split among various components. For example, the query log 224 may be distinct from the query server 210. In some embodiments the query log 224 may be stored on one or more servers whose primary function is to store and process query log information. Similarly, the URL database 225 may be stored on or more servers whose primary purpose is to store and process information about known URLs.

Figure 3:
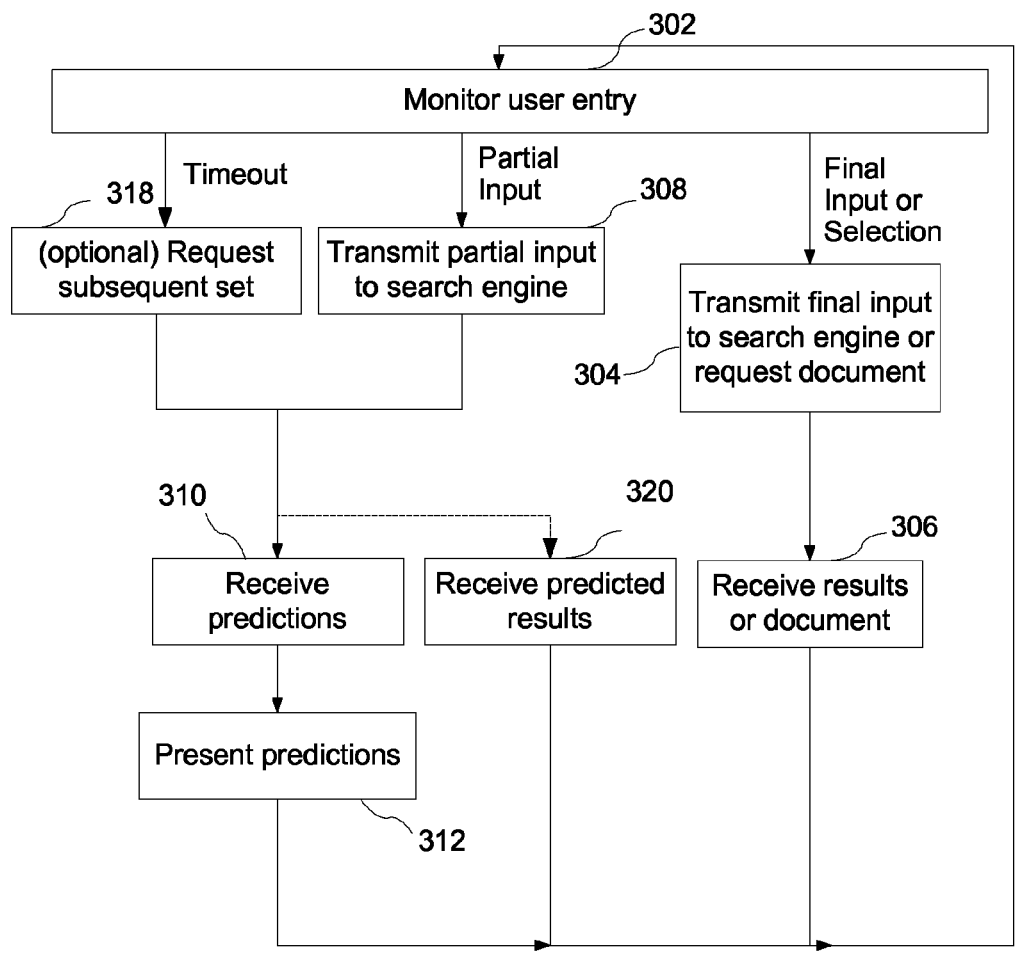
FIG. 3 depicts a process in a search assistant in accordance with some embodiments of the present invention.

FIG. 3 illustrates an embodiment of the invention that may be implemented in the search assistant 204 of a client system 202 (FIG. 2). The search assistant 204 monitors the user's entry of a search query on the client system 104 (302). In some embodiments, the search assistant 204 monitors the user's entry of a uniform resource locator (URL) input string, such as in the address field of a browser window. The user may enter the search query or URL in a number of ways including a browser window, a search tool, or any other input mechanism. The search assistant 204 may identify two different scenarios. First, the search assistant 204 receives or identifies a final input (302-final input) when the user has indicated completion of the input string or selected a presented prediction. Second, the search assistant 204 receives or identifies a partial input (302-partial input) when an input is identified prior to when the user indicates completion of the input string (as described below). In a third, optional scenario (described in more detail below), the search assistant 204 determines or receives notification that the user has not selected one of the predictions within a specified time period.

When a final input or selection (302-final input) is identified as a search query, the input is transmitted to the search engine 208 (304) for processing. The search engine 208 returns a set of search results, which is received by the search assistant 204 (306) or by a client application, such as a browser application. The list of search results is presented to the user such that the user may select one of the documents for further examination (e.g., visually or aurally). When the final input is a URL, the request is transmitted to the appropriate document host (304) and the document, if available, is returned (306). After the response is received (306), the user's input activities are again monitored (302). In some embodiments, the URL request is sent to the search engine 208 for logging and the request is redirected to the appropriate document host.

A final input may be identified by the search assistant 204 in a number of ways such as when the user enters a carriage return, or equivalent character, selects a search button in a graphical user interface (GUI) presented to the user during entry of the search query, or by possibly selecting one of a set of possible queries presented to the user during entry of the search query. One of ordinary skill in the art will recognize a number of ways to signal the final entry of the search query.

Prior to the user signaling a final input, a partial input may be identified (302-partial input). A partial input may be identified in a number of ways. For a search query, a partial input includes a single search term of the search query, multiple search terms, or a predefined a number of characters of a search term.

In some embodiments, a partial input is identified by detecting entry of delimiter or other character (e.g., without limitation, a quote character, a period, a parenthesis character, a slash character, arrow key detection or tab entry). Entry of a delimiting character may indicate that a user has finished entering a desired term or portion of the input and is moving onto the next search term or portion.

In some embodiments, a partial input is identified by detecting entry of a pre-determined number of characters. In these embodiments, the input contains a number of characters less than a full input but it may still desirable to identify the partial input before the user has entered all of the characters. This technique is desirable, for example, when the search term or URL contains a large number of characters or when the pre-determined number of characters is large enough to result in useful predictions.

In some embodiments, a partial input is identified by detecting the absence of a character being entered within a period of time, the absence representing a pause by the user. The pause may signify that the user has entered one search term or portion of the complete string but has not entered the space key (or other delimiting character) to start entering another term or signify that the search query is in fact complete but the user has not yet so signaled.

Regardless of the way in which the partial input is identified, it is transmitted to the search engine 208 (308) for processing. In response to the partial search query, the search engine 208 returns a set of ordered predicted search queries and/or URLs (310) which is presented to the user (312) ordered in accordance with a ranking criteria. The predictions may be displayed to the user in a number of ways. For example, the predictions could be displayed in a drop-down window, a persistent, or non-persistent window or other ways. In some embodiments, queries which the user had previously submitted could be visually indicated to the user (e.g., by highlighting the user's own previously entered queries).

In some embodiments, the predicted search queries are ordered in accordance with a frequency of submission by a community of users. In some embodiments, the search queries are ordered, at least in part, in accordance with a last time/date value that the query was submitted. In some embodiments, the search queries are ordered in accordance with personalization information, such as user personalization information or community information. For instance, user personalization information may include information about subjects, concepts or categories of information that are of interest to the user. The user personalization information may be provided directly by the user, or may be inferred with the user's permission from the user's prior search or browsing activities, or may be based at least in part on information about a group associated with the user or to which the user belongs (e.g., as a member, or as an employee). The set of predicted search queries may be initially ordered in accordance with a first ranking criteria, such as predefined popularity criteria, and then reordered if any of the predicted search queries match the user personalization information of the user so as to place the matching predicted search queries at or closer to the top of the ordered set of predicted search queries.

One skilled in the art will recognize a number of ways to present the predicted search queries and/or URLs to the user. For example, the predicted search queries and/or URLs might be presented in a drop down menu. Regardless of the manner in which the predicted queries and/or URLs are presented to the user, the user may select one of the queries and/or URLs if the user determines that one of the predictions matches the intended entry. In some instances, the predictions may provide the user with additional information which had not been considered. For example, a user may have one query in mind as part of a search strategy, but seeing the predicted results causes the user to alter the input strategy. Once the set is presented (312), the user's input is again monitored. If the user selects one of the predictions (302-final), the request is transmitted either to the search engine 208 as a search request or to a resource host as a URL request (304), as applicable. After the request is transmitted, the user's input activities are again monitored (302). As mentioned above, in some embodiments, the URL request is transmitted to search engine 208 for logging purposes.

If, on the other hand, the user has not selected one of the predictions within a specified time period, then it is likely that the user did not find a satisfactory prediction in the predictions that were initially returned. For example, a user's intended input did not have a high enough ranking value to be included in the set of ordered predictions. Accordingly, in some optional embodiments, if the user has not selected one of the predictions within a specified period of time (e.g., 5 or 10 seconds) (302-timeout), then a request is sent to the search engine 208 for another set of predictions (318). The subsequent set of predictions could include predictions having ranking values lower than the set previously submitted. Alternately, a second set of criteria may be used to identify predictions in the second set, where the second set of criteria are different than a first set of criteria used to select and rank the first set of predictions. For instance, one of the two sets may use selection criteria that takes into account personal information about the requestor while the other set does not. In some optional embodiments, other triggers may be used to request one or more sets of subsequent predictions. For example, a user-initiated activity (e.g., pressing the "tab" key, an arrow key, a function key, and the like) may cause a request for a subsequent set. In some embodiments, information associated with a search requestor is maintained at the server to identify which predicted results have already been conveyed to the search requestor. In some embodiments, the client includes information in the request for a subsequent request which indicates which results have already been conveyed to the search requestor. In one such embodiment the prediction server 212 uses this information to exclude from subsequently predicted results either all of the previously predicted results or a subset of the previously predicted results. In another embodiment, the information about previously predicted results is used by the prediction server 212 to produce additional or different results only if the prediction server 212 is able to identify additional predicted results that match the requestor's partial query. In some embodiments, triggering a subsequent set of predictions causes predictions to be made using a search requestor's search queries stored locally, while in other embodiments the subsequent set of predictions includes both predictions generated based on historical queries of a community of users and the search requestor's historical search queries, if any, that match the requestor's partial query.

In some embodiments, one or more sets of predicted results are cached locally at the client. When the search requestor modifies the current query to reflect an earlier partial input (e.g., by backspacing to remove some characters), the set of predicted results associated with the earlier partial input is retrieved from the client cache and again presented again to the user instead of the partial input being sent to the search engine.

In some embodiments, the search engine 208 may optionally return predicted results (320). This activity may overlap with receiving the predictions (310) and is indicated by the dashed line to 320 in FIG. 3. The predicted results are presented (320) and the monitoring of the user resumes (302). The presentation to the user can be accomplished in a number of ways. For example, the results can be displayed in a portion of a non-persistent window, a pop-up window, or in a portion of the current display or a portion of a user interface. The web page used for entry of the query and for presenting predicted results may include JavaScript or other embedded code or instructions to facilitate the display of the predicted results and to respond to user selection of any of the predicted results. Other ways are envisioned. The predicted results correspond to documents or information that would have been returned based on the request being one or more of the predicted queries or URLs. In some embodiments, the predicted results include snippets of the content at one or more locations corresponding to the predicted results. In some embodiments, the predicted results include one or more thumbnails of one or more web pages or other content at one or more locations corresponding to the predicted results. In some embodiments, the results are search results based on one or more of the predicted queries. For example, in some embodiments, the results presented (320) may be one or more documents relevant to one or more of the predicted queries or predicted URLs. Accordingly, the user may have predicted results presented that match a desired request before the user finishes entering the request (e.g., search request or URL request). In such situations, the processing latency as viewed by the user is effectively reduced to less than zero because the user did not have to complete the input to obtain the desired result.

Figure 4:
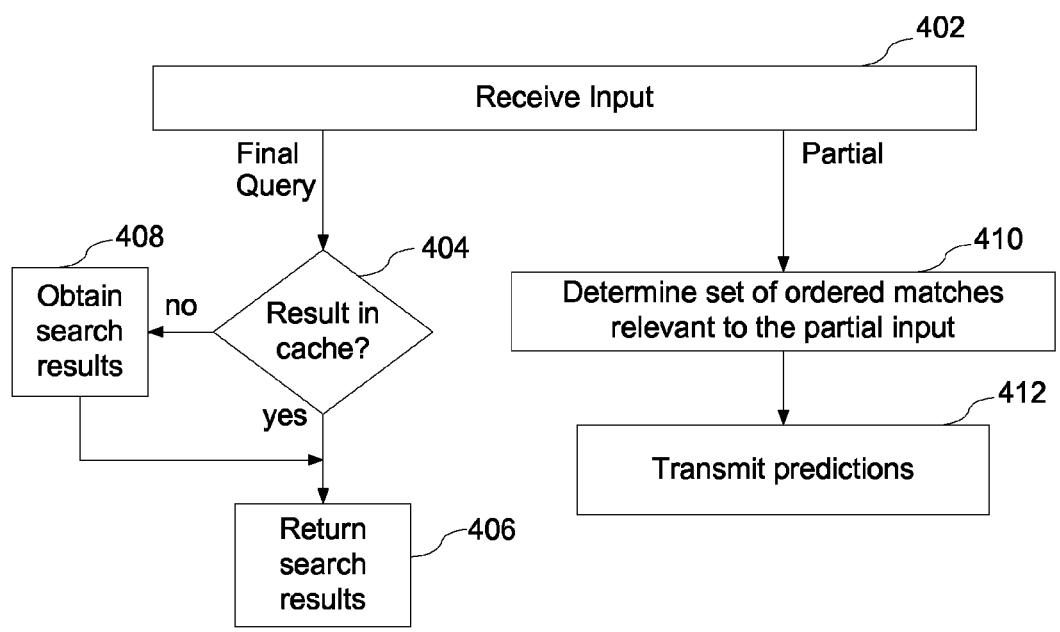
FIG. 4 depicts a process for receiving query input and creating responses thereto in accordance with some embodiments of the present invention.

FIG. 4 illustrates the activity occurring in the search engine 208 when it receives an input according to some embodiments. The search engine 208 receives the input and determines whether the input indicates a final input or a partial input (402). If the search engine 208 determines that the received input is a final query (402-final query) then it determines whether search results relevant to the query are present in the cache 232 (404). If the relevant search results are in the cache 232 (404-yes), then those results are returned to the client 104 (406). On the other hand, if the search results are not in the cache (404-no), then search results relevant to the query are obtained (408), and then returned to the client 104 (406). In some embodiments, a URL request, when complete, is not received by the search engine 208 because the search assistant sends the request to the resource host. In some embodiments, the URL request is received by the search engine 208 for tracking purposes (such as storage in a URL database) and the request is redirected to the resource host by the search engine 208.

If the search engine 208 determines that the received input was a partial input (402-partial), then it determines a set of ordered matches that correspond to the partial input (410), and transmits the set to the client 104 (412). As will be explained below, in some embodiments, the set of ordered matches sent to the client 104 is one of many pre-computed sets of ordered matches. Although the following operations are described in terms of a partial query, the same techniques are equally applicable to partial inputs of URLs. In some embodiments, the set of ordered matches returned is relevant only to queries. In some embodiments, the set of ordered matches is relevant to only URLs. And, in some embodiments, the set of ordered matches is relevant to both queries and URLs.

Figure 5:
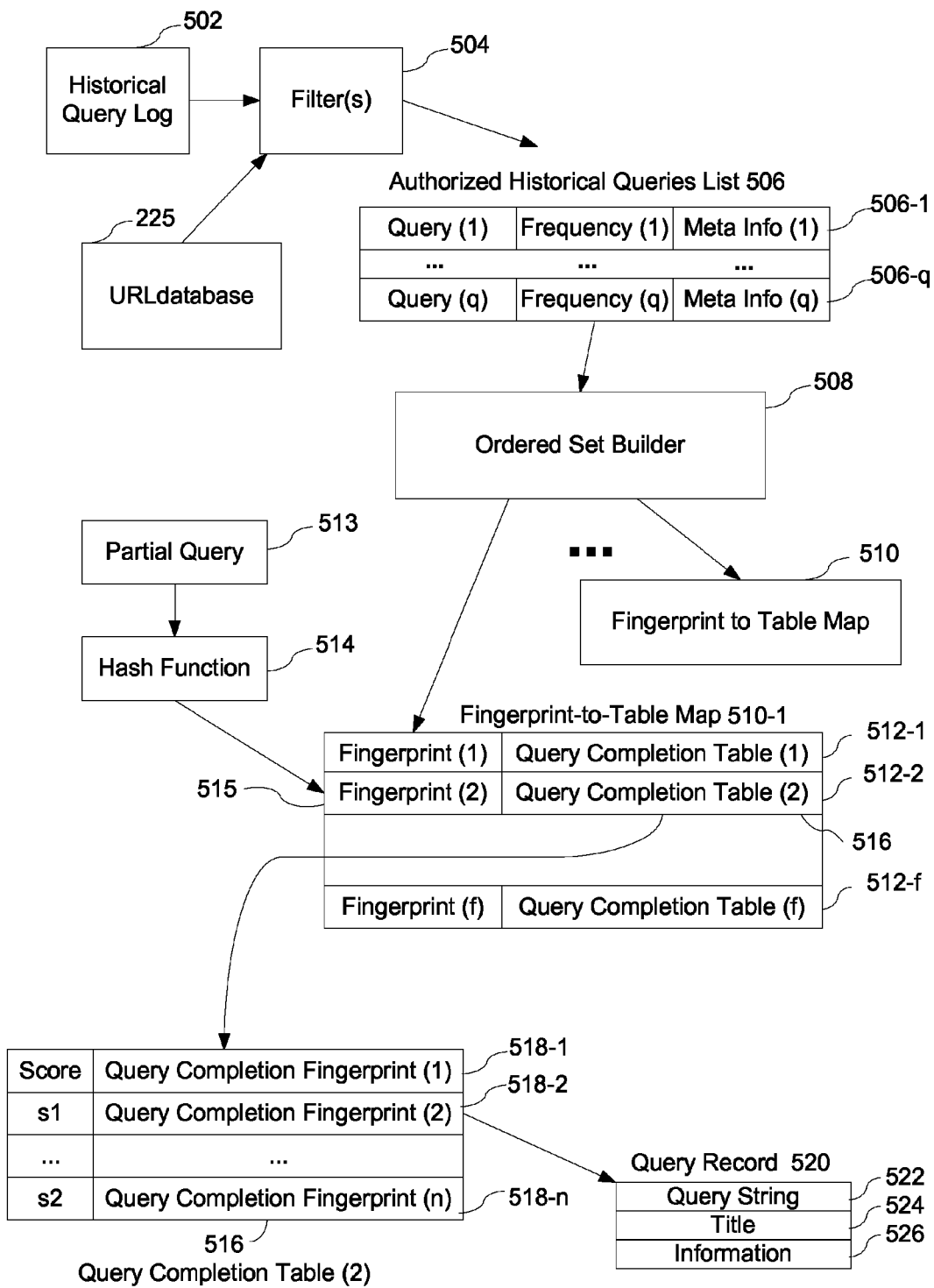
FIG. 5 depicts flows of information associated with creating and using a fingerprint-to-table map in accordance with some embodiments of the present invention.

To aid in understanding how, according to some embodiments, the search engine 208 determines which set of ordered matches to return, it is helpful to begin with a description of how the ordered sets are created and used. FIG. 5 shows a set of data structures associated with historical queries (i.e., queries previously submitted) used for predicting queries corresponding to partially entered queries. A search engine or user input prediction system may also include a parallel set of data structures associated with historical URLs (i.e., URLs previously submitted) used for predicting URLs corresponding to partially entered URLs.

Referring to FIG. 5, a historical query log 502 is filtered by one or more filters 504 to create an authorized historical queries list 506. An ordered set builder 508 creates one or more fingerprint-to-table maps 510 from the authorized historical queries list 506 based on certain criteria. When the partial query is transmitted (FIG. 3, 308), it is received at the search engine 208 as partial query 513. A hash function 514 is applied to the partial query 513 to create a fingerprint, i.e., a b-bit binary value (e.g., a 64-bit number). An applicable fingerprint-to-table map 510 (e.g., 510-1) is searched for the fingerprint (e.g., 515) to identify a query completion table 516 associated with the fingerprint. The query completion table 516 provides an ordered set of predicted queries relevant to the partial query 513.

An applicable fingerprint-to-table map 510 may be selected based on a number of different factors associated with a user or a request. Information used to select the applicable fingerprint-to-table map 510 could come from profile information provided by the user or the search assistant 204, information gleaned from the request itself (e.g., language), information associated with the user in user information processing module 222, or other sources. For example, fingerprint-to-table maps could be selected based on certain connection information associated with the user or the search requestor (e.g., device-type, connection-speed, connection type, and the like). In some embodiments, the number of predictions or length of each of the query predictions depends on such connection information. Devices with small user interfaces might receive fewer numbers of predictions and/or queries with fewer number of terms. A query term could have an importance factor associated with it and terms having lower importance factors could be truncated from the query before terms having higher importance factors. In some embodiments, different sets of fingerprint-to-table maps 510 may be used for respective categories of users, thereby providing predicted results that are biased in accordance with one or more categories or topics associated with the user. For instance, partial search queries received from a particular website might be mapped to predicted results using a set of fingerprint-to-table maps that were generated from historical queries received from the same website, or from a group of websites deemed to be similar to the particular website. Similarly, an individual user may, with his/her permission, have a user profile that specifies information about the user or about a group associated with the user, and that "personalization information" may be used to identify a respective set of fingerprint-to-table maps for use when predicting results for that user. It is noted that the overhead associated with adding multiple sets of fingerprint-to-table maps 510 may be modest, because multiple sets of fingerprint-to-table maps 510 could point to the same query completion table 516, and the query completion tables 516 occupy much more storage than the fingerprint-to-table maps 516.

In some embodiments, some preprocessing occurs to the partial query before the fingerprint is created. In one embodiment, conspicuously misspelled words in the partial query are identified and corrected by comparing one or more of the complete search terms with entries in a dictionary. One or more predicted results from queries including the correctly spelled word are merged with the predicted results returned to the user. In another example, common prefix information could be removed (e.g., "http://" or "www."). In some embodiments, the terms in the query are analyzed to extract concepts embodied in the search terms indicating a particular category of information (e.g., "technology, "food", "music" or "animals"). One or more predicted results from queries related to one or more of the extracted concepts are merged with the predicted results returned to the user.

The historical query log 502 contains a log of previously submitted queries received by the search engine 208 over a period of time. In some embodiments, the queries are from a particular user. In some embodiments, the queries are from a community of users sharing at least one similar characteristic such as belonging to the same workgroup, using the same language, having an internet address associated with the same country or geographic region, or the like. The selection of the community determines the pool of previously submitted queries from which the predictions are drawn. Different communities would tend to produce different sets of predictions.

The historical query log 502 may also contain information associated with each submitted query. In some embodiments, the query information includes the date and time that the query was submitted or received. In some embodiments, the query information includes the internet protocol (IP) address from where the query was submitted. In some embodiments, the query information contains a unique source identifier for the query (e.g., a value from a cookie stored on the user's machine where the value is associated with a particular search assistant 204). While the unique identifier does not directly identify any particular user, it may be associated with a particular installation of a browser or toolbar. In some embodiments, a user may permit direct identification with the unique identifier for certain personalization features which could be accessed using user information processing module 222.

In some embodiments, a fingerprint value is associated with the query. The fingerprint value may be calculated by applying a hash function to the query string. In some embodiments, other types of meta-data are associated and stored with the query such as the query language or other information which might be provided by the user or search assistant in accordance with user preferences (e.g., identification or profile information indicating certain preferences of the user). In some embodiments, the meta-information includes category or concept information gleaned from analyzing the terms in the query. The period of time over which the queries are logged is a variable and represents a tradeoff between storage capacity and potential accuracy of the predictions. It is likely that longer periods of time will more accurately reflect a query's popularity over the entire community, however, this requires more storage. On the other hand, a popularity ranking over a long period of time may not reflect a transient popularity for current events.

One or more filters 504 are used to determine queries authorized for further processing. For example, filters can eliminate certain queries based on various criteria. In some embodiments, a privacy filter 504 prevents queries which have not been received from more than a certain number of unique submitters to be included in the authorized historical queries list 506. This could be accomplished by examining the unique identifier associated with each query, if one exists, and identifying only those queries which have been submitted by at least n unique submitters, where n is a number chosen based on privacy concerns (e.g., three or five unique submitters). In some embodiments, the filters 504 include a filter that eliminates queries which are infrequently submitted and therefore not likely to be selected by a user. In some embodiments, the filters 504 include an appropriateness filter 504 that blocks certain queries from inclusion based on a number of different factors such as the presence of one or more particular keywords in a query, and/or based on the content of the search results or documents that correspond to the query.

Other types of filters could be easily imagined. For example, a filter could block queries submitted earlier than a particular historical point in time, such that the authorized historical queries list 506 represent recently submitted queries. What is considered recent depends on the embodiment (e.g., hours, days, weeks, months, or years). In yet another example, an anti-spoofing filter 504 could be use to prevent the query/URL prediction system from being spoofed by a large number of a artificially generated queries or URL submissions. For instance, an anti-spoofing filter 504 might filter out multiple submissions of the same query or URL received from the same user or from the same client computer.

After the historical query log 502 has been filtered by the one or more filters 504, the result is the authorized historical queries list 506, i.e., a list of queries eligible to be returned to the user as suggested query completions. The authorized historical queries list 506 includes historical query 506-1 to historical query 506-q, where q represents the number of queries included in the authorized historical queries list 506. The value of q could be equal to or less than the total number of queries filtered from the historical query log 502. For example, filtered queries having frequencies less than a predetermined threshold could be ignored. In some embodiments, a new authorized historical queries list 506 is built periodically such as hourly, nightly, weekly or other periods. In some embodiments, the current authorized historical queries list 506 is updated based on recent entries to the query log 224, after applicable filtering.

Each query in authorized historical queries list 506 (e.g., 506-1) includes the query, its frequency and, optionally, meta-information. The query could be a string of characters. The frequency information indicates how many times the query was submitted over a period of time. As mentioned above, a unique identifier may be used to count the number of times unique searchers submitted the query. Because different users may use multiple search assistants or some queries may not include a unique identifier, the frequency number may not represent the actual number of unique users submitting the search query. Nonetheless, a query's frequency can act as a proxy for a query's popularity. In some embodiments, the authorized historical queries list 506 is ordered alphabetically based on the query. In other embodiments, the authorized historical queries list 506 is ordered based on the query frequency.

The meta-information, may include information similar to the meta-information discussed above in reference to the historical query log 502 (e.g., location or language information). In some instances, the same query will have entries in the historical query log 502 which differ not in the query string, but in the meta-information. Accordingly, the meta-information for a particular authorized historical query 506-1 may indicate differing meta-information for the same query. For example, the meta-information for a query submitted from two different locations, such as Europe or Asia, would indicate both locations as a source location of the query. The meta-information could also indicate user profiling information to indicate what types of users had submitted the query. One of ordinary skill in the art will recognize various types of meta-information that might be useful to categorize or group queries related by common set of characteristics (e.g., language or location). In some embodiments, the query terms are analyzed and associated with certain categories of information. For example, a search query including "dog" and "breed" is associated with a "dog" or "animal" category. The meta-information in some embodiments, contains this category information. In some embodiments, meta-information for a single entry in the authorized historical queries list 506 is produced from the multiple queries, for example, by providing the date/time of the query as the last date/time value that the query was submitted.

The ordered set builder 508 uses the authorized historical queries list 506 to build a set of fingerprint-to-table maps 510-1 to 510-t, where t represents the number of fingerprint-to-table maps 510 built. Any number of fingerprint-to-table maps 510 could be built depending on the number of ways desired to categorize predicted queries. Each of the fingerprint-to-table maps 510 contain sets of ordered predictions each mapped to a particular partial query. The fingerprint-to-table maps 510 differ based on characteristics of information such as might be found in the meta-information. For example, there may be one fingerprint-to-table map 510 for each language (e.g., one for English language queries; one of French language queries; one for Japanese language queries). Similarly, different fingerprint-to-table maps 510 could be created for geographical regions. As another example, different fingerprint-to-table maps 510 could be created from queries from particular IP addresses or groups of addresses, such as those from a particular network or a particular group of individuals (e.g., a corporation). Using the meta-information to create different fingerprint-to-table maps 510, allows the predictions to be based on users having characteristics similar to that of the searcher and which should increase the likelihood of a correct prediction. In some embodiments, different fingerprint-to-table maps 510 are based on different ranking criteria for the queries (e.g., frequency, last date/time, personalization categories or characteristics, and so on). In some embodiments, different fingerprint-to-table maps 510 are based on the type of user input (i.e., query string or URL).

Using fingerprint-to-table map 510-1 as an example, each of the fingerprint-to-table maps 510 includes a number of entries 512-1 to 512-f, where f represents the number of entries in the fingerprint-to-table map 510-1. The number of entries in any particular fingerprint-to-table map 510 depends on the number of different partial queries for which the prediction server 212 will return predictions.

Each of the entries in the fingerprint-to-table map 510-1 (e.g., 512-2) includes a fingerprint (e.g., fingerprint (2) 515) and a query completion table (e.g., query completion table (2) 516). The fingerprint-to-table maps 510 serve to associate fingerprints (e.g., fingerprint (2) 515) to query completion tables (e.g., query completion table (2) 516)).

The fingerprint (2) 515 represents a fingerprint value for a partial query. The fingerprint (2) 515 may be calculated, for example, by applying a hash function to a partial query to create a b-bit binary value (e.g., a 64-bit number). Accordingly, the fingerprint-to-table map 510-1 may be searched for a fingerprint which matches the fingerprint of the partial query 513 (e.g., fingerprint 515).

The query completion table (2) 516 contains a list of query completion fingerprints 518-1 to 518-n, where n represents the number of query completion fingerprints in the query completion table (2) 516. In some embodiments, n represents the number of predicted queries returned to the search assistant 204 (e.g., 10 predicted queries). In other embodiments, less than n are returned. In some embodiments, n is greater than the number of results to be returned in a set of ordered queries. In some embodiments, n is twice the number to be returned and the first n/2 are provided as a first set of ordered predicted queries and the second n/2 are provided as a subsequent set of ordered predicted queries (e.g., the second set of 10 predicted queries is sent subsequent to the first set of 10 upon certain conditions). In some embodiments, the query completion table 516 includes a score for each query completion fingerprint 518. The scores are used to order the items in the query completion table 516, in descending score order. In some embodiments, the scores are a permanent part of the query completion table, while in other embodiments the scores are deleted or not kept after the formation of the query completion tables 516 is completed.

Each query completion fingerprint 518 is a fingerprint value associated with a complete query. The query completion fingerprint 518 (e.g., 518-2) maps to an associated query record 520. The query record 520 includes a query string 522 which contains the query string for the complete query. This approach facilitates entries in multiple query completion tables 516 referencing the same query string 522, yet only requiring that the actual query string be stored in a single location (e.g., query string 522). In some embodiments, however, the query strings 522 may be stored in place of the query completion fingerprints 518 in a query completion table 516. In some embodiments, query record 520 for URL strings include a URL title 524 representing a title associated with the URL. In some embodiments, additional information associated with a URL is provided in information 526.

In some embodiments, the query completion table 516 is an ordered list of n queries relevant to the partial query associated with the fingerprint 515. The list may be ordered in accordance with various ranking criteria such as frequency, date/time of submission, and so on. In some embodiments, the ranking criteria may take into account two or more factors, such as both frequency and date/time or submission, by generating a score or rank for each query that takes into account each of the two or more factors. In a simple example, historical queries whose date/time is more than 24 hours in the past may contribute a value of "1" to the ranking score of the query, while historical queries whose date/time is within the last 24 hours may contribute a value of "2" to the ranking score of the query. In this example, recent historical queries are weighted more heavily than older historical queries in determining the rank of each authorized historical query.

In some embodiments, the ordered set builder 506 creates or updates the fingerprint-to-table maps 510 and associated query completion tables 516 and/or 910 (FIG. 9) periodically (e.g., hourly, daily, weekly) so as to keep the query and/or URL predictions produced by the prediction server consistent with queries and/or URLs recently submitted by the applicable community of users.

Figure 6:
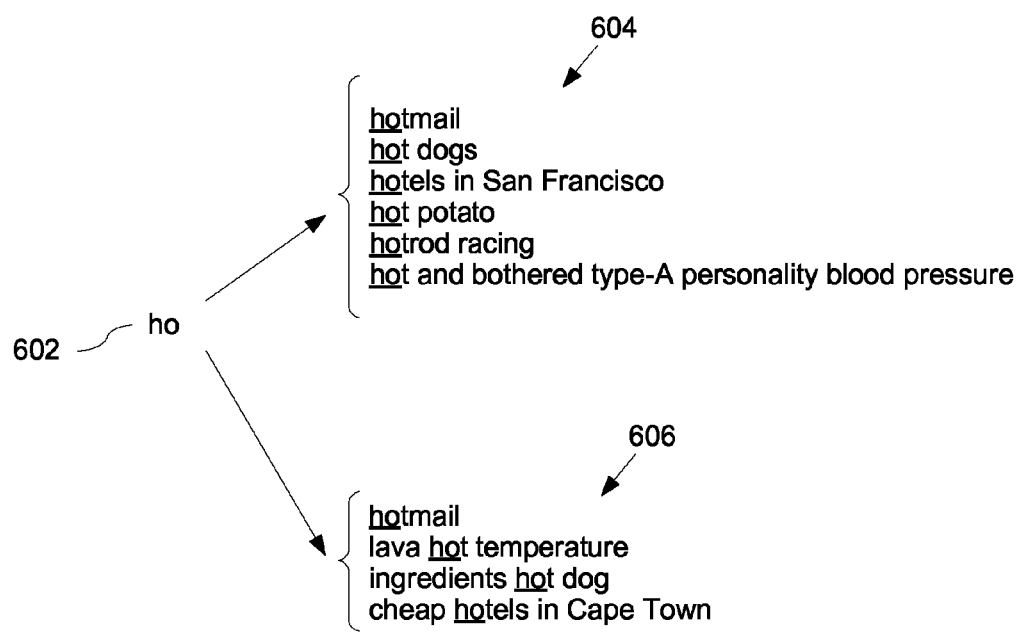
FIG. 6 depicts examples of relevancy of input strings in accordance with some embodiments of the present invention.

Referring to FIG. 6, a partial query of "ho" 602 might have a set of completed queries 604 as being relevant to the partial query 602. The first position of the set of completed queries 604 includes the query having the highest frequency value (e.g., "hotmail"), it is followed in the second position with the query having the next highest frequency value (e.g., "hot dogs"), and so on. In this example, a complete query's relevancy to a given partial query is determined by the presence of the partial query at the beginning of the complete query (e.g., the characters of "ho" begin the complete queries of "hotmail" and "hotels in San Francisco"). In other embodiments, the relevancy is determined by the presence of the partial query at the beginning of a search term located anywhere in the complete query, as illustrated by the set of completed queries 606 (e.g., the characters "ho" are found at the beginning of "hotmail" and at the beginning of the second search term in "cheap hotels in Cape Town").

Figure 7:
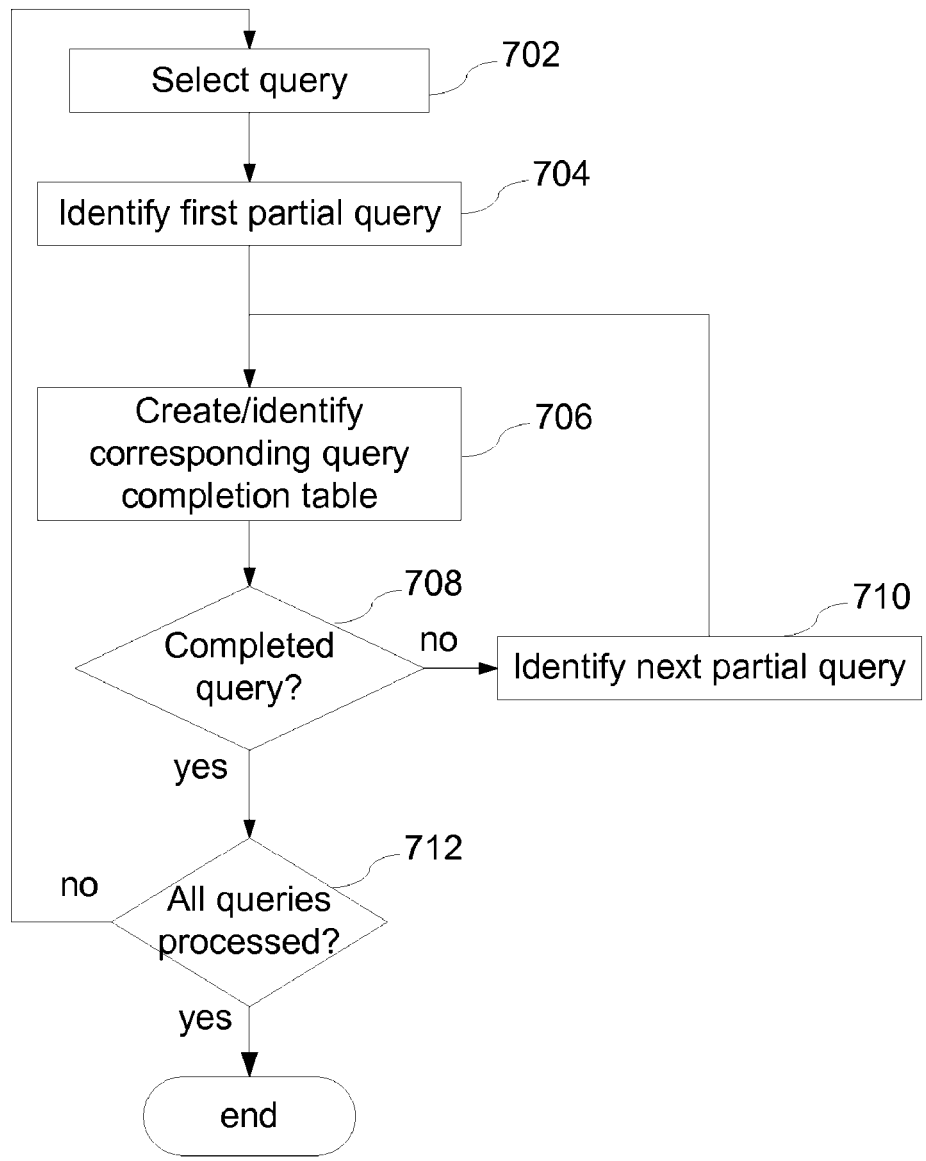
FIG. 7 depicts a process for processing historical queries in accordance with some embodiments of the present invention.

To create the set of query completion tables 516, one of the queries in the authorized historical queries 506 is selected (FIG. 7, 702). In some embodiments, only queries having the desired meta-information are processed (e.g., queries in the English language). The first partial query is identified from the selected query (704). In one embodiment, the first partial query is the first character of the selected query (i.e., "h" for a query string of "hot dog ingredients"). In some embodiments, preprocessing is applied before partial queries are identified (e.g., stripping off "http://" or "www."). An entry is made in a table which indicates the partial query, the complete query corresponding to the partial query and its frequency. In other embodiments, other information which is used for ranking is stored (e.g., date/time values, or a ranking score computed based on two or more factors). If the partial query does not represent the entire query, then the query processing is not complete (708-no). Accordingly, the next partial query is identified (710). In some embodiments, the next partial query is identified by adding the next additional character to the partial query previously identified (i.e., "ho" for a query string of "hot dog ingredients"). The process of identifying (710) and of updating of a query completion table (706) continues until the entire query is processed (708-yes). If all of the queries have not yet been processed (712-no), then the next query is selected and processed until all queries are processed (712-yes). In some embodiments, as items are added to a query completion table, the items are inserted so that the items in the table are ordered in accordance with the rank or score. In another embodiment, all the query completion tables are sorted at the end of the table building process so that the items in each query completion table are ordered in accordance with the rank or score of the items in the query completion table. In addition, one or more query completion tables may be truncated so that the table contains no more than a predefined number of entries.

Referring to FIG. 8, an exemplary processing of the first five characters of the query string of "hot dog ingredients" is illustrated in table 802 at 804 through 812. An exemplary processing of the first four characters of the query string of "hotmail" is illustrated at 814 through 820.

In some embodiments, a query completion table for a given partial query is created by identifying the n most frequently submitted queries relevant to the given partial query from the table and placing them in ranked order such that the query having the highest rank (e.g., the highest ranking score or frequency) is at the top of the list. For example, a query completion table for the partial query "hot" would include both complete query strings of 808 and 818. When the ranking is based on frequency, the query string for "hotmail" would appear above the query string for "hot dog ingredients" because the frequency of the query string in 818 (i.e., 300,000) is larger than that of the query string in 808 (i.e., 100,000). In some embodiments, a URL's popularity could be given a value assigned to a particular web page providing an indication of its importance among a set of web pages (e.g., PageRank). Accordingly, when the ordered set of prediction is returned to the user, the queries having a higher likelihood of being selected are presented first. As mentioned above, other values could be used for ranking drawn from the meta-information (e.g., date/time values, or personalization information).

Figure 9:
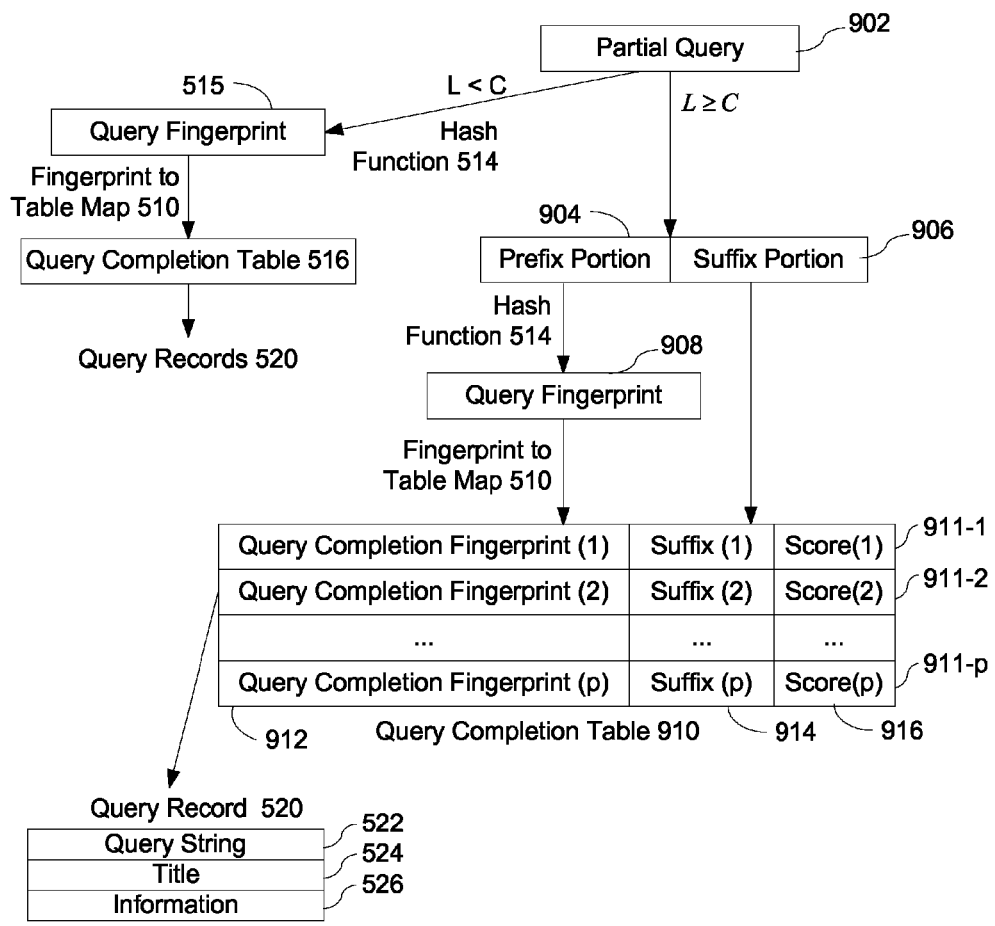
FIG. 9 depicts data structures associated with a query completion table using suffixes in accordance with some embodiments of the present invention.
Figure 10:
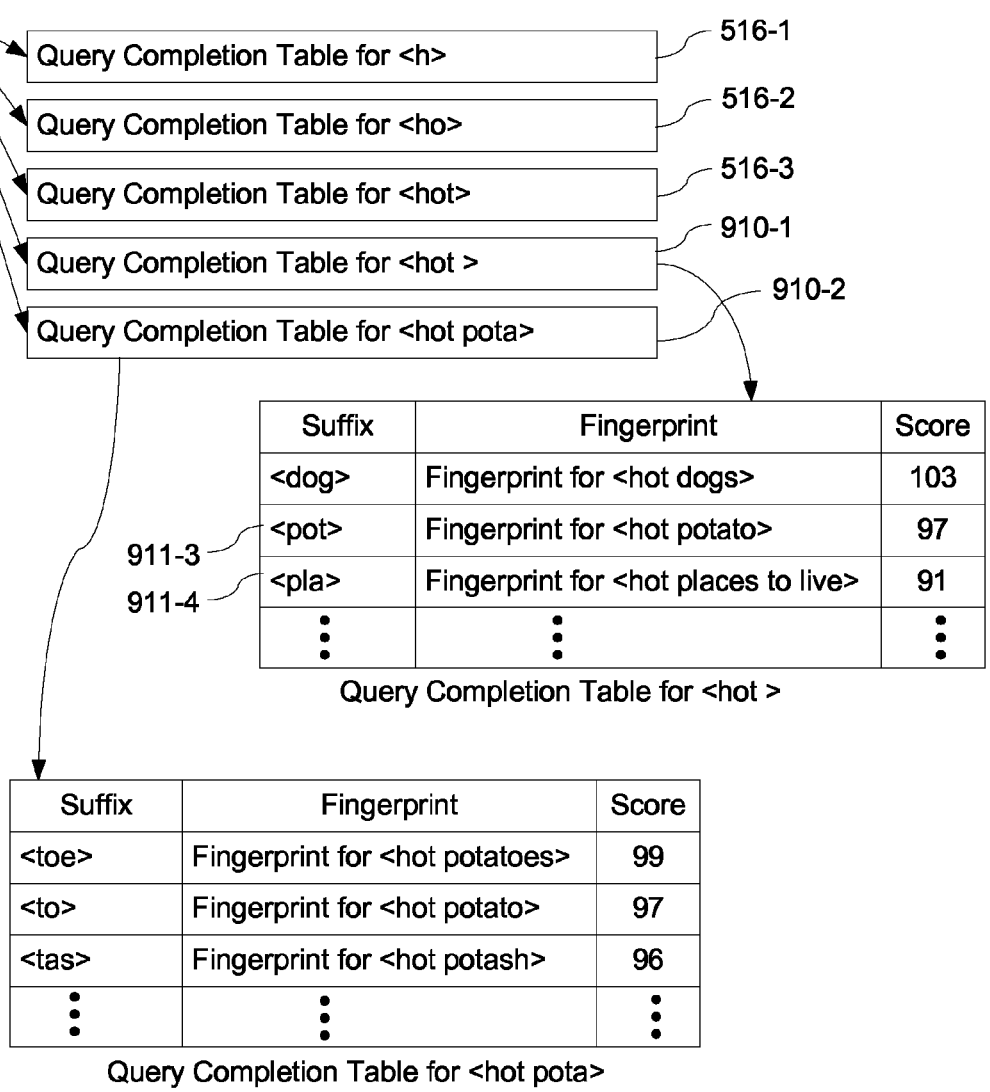
FIG. 10 depicts a portion of an exemplary query completion table in accordance with some embodiments of the present invention.

Referring to FIGS. 9 and 10, in some embodiments the number of query completion tables is reduced by dividing the historical query strings into "chunks" of a predefined size C, such as 4 characters. The query completion tables for partial queries of length less than C remain unchanged. For partial queries whose length is at least C, the partial query is divided into two portions: a prefix portion and a suffix portion. The length of the suffix portion, S, is equal to the length of the partial query (L) modulo C:

$$S = L \text{ modulo } C.$$

where L is the length of the partial query. The length of the prefix portion, P, is the length of the partial query minus the length of the suffix: P=L−S. Thus, for example, a partial query having a length of 10 characters (e.g., "hot potato"), would have a suffix length S of 2 and a prefix length P of 8 when the chunk size C is 4.

When performing the process shown in FIG. 7, step 706, identifying or creating a query completion table corresponding to a partial query is conceptually illustrated in FIG. 9. FIG. 9 schematically illustrates the process used both for generating query completion tables as well as for lookup when processing a user entered partial query. When the length of the partial query is less than the size of one "chunk", C, the partial query is mapped to a query fingerprint 515, for example by using a hash function 514 (FIG. 5). The fingerprint 515 is mapped to a query completion table 516 by a fingerprint to table map 510, which in turn contains query completion fingerprints 518 or pointers to a set of query records 520 (which contain query strings 522, FIG. 5).

When the length of the partial query is at least the size of one chunk, C, the partial query 902 is decomposed into a prefix 904 and suffix 906, whose lengths are governed by the chunk size, as explained above. A fingerprint 908 is generated for the prefix 904, for example by applying a hash function 514 to the prefix 904, and that fingerprint 908 is then mapped to a "chunked" query completion table 910 by a fingerprint to table map 510. The structure of the chunked query completion table 910 is different from the query completion table 516 shown in FIG. 5, in that each entry 911 of the chunked query completion table 910 has a suffix entry 914 as well as a query completion fingerprint 912. Each entry 911 may optionally include a score 916 as well, used for ordering the entries in the query completion table 910. The suffix has a length, S, which can be anywhere from zero to C−1, and comprises the zero or more characters of the partial query that are not included in the prefix 904. In some embodiments, when generating the query completion table entries 911 for a historical query, only one entry is made in each chunked query completion table 910 that corresponds to the historical query. In particular, that one entry 911 contains the longest possible suffix for the historical query, up to C−1 characters long. In other embodiments, up to C entries are made in each chunked query completion table 910 for a particular historical query, one for each distinct suffix.

FIG. 10 shows a set of query completion tables which contain entries 911 corresponding to the historical query "hot potato". This example assumes a chunk size, C, equal to four. In other embodiments the chunk size may be 2, 3, 5, 6, 7, 8, or any other suitable value. The chunk size, C, may be selected based on empirical information. The first three of the query completion tables shown in FIG. 10, 516-1 through 516-3, are for the partial queries "h", "ho" and "hot", respectively. The next two query completion tables, 910-1 and 910-2 correspond to the partial queries "hot pot" and "hot potato", respectively, having partial query lengths of 7 and 10. Referring back to step 710 of FIG. 7, with each iteration of the loop formed in part by step 710, the length of the partial queries initially increases by steps of 1 character, until a length of C−1 is reached, and then the length of the partial queries increases by steps of C characters, until the full length of the historical query is reached.

The entries 911 of each chunked query completion table are ordered according to the ranking values (represented by scores 916) of the query strings identified by the query completion fingerprints 912 in the entries 911. For partial queries having less than C characters, the number of queries in the associated query completion table 516 is a first value (e.g., 10 or 20), which may represent the number of queries to return as predictions. In some embodiments, the maximum number (e.g., a number between 1000 and 10,000) of entries 911 in each chunked query completion table 910 is significantly greater than the first value. Each chunked query completion table 910 may take the place of dozens or hundreds of ordinary query completion tables. Therefore, each chunked query completion table 910 is sized so as to contain a number (p) of entries corresponding to all or almost all of the authorized historical queries having a prefix portion that corresponds to the chunked query completion table, while not being so long as to cause an undue latency in generating a list of predicted queries for a user specified partial query.

After the query completion tables 516, 910 and fingerprint-to-table maps 510 have been generated from a set of historical queries, these same data structures (or copies thereof) are used for identify a predicted set of queries corresponding to a user entered partial query. As shown in FIG. 9, the user entered partial query is first mapped to a query fingerprint 515 or 908, by applying a hash function 514 either to the entire partial query 902 or to a prefix portion 904 of the partial query, as determined by the length of the partial query. The query fingerprint 515 or 904 is then mapped to a query completion table 516 or 910 by performing a lookup of the query fingerprint in a fingerprint-to-table map 510. Finally, an ordered set of up to N predicted queries is extracted from the identified query completion table. When the length of the partial query is less than the chunk size, the ordered set of predicted queries are the top N queries in the identified query completion table. When the length of the partial query is equal to or longer than the chunk size, the identified query completion table is searched for the top N items that match the suffix of the partial query. Since the entries in the query completion table 910 are ordered in decreasing rank, the process of searching for matching entries begins at the top and continues until the desired number (N) of predictions to return is obtained (e.g., 10) or until the end of the query completion table 910 is reached. A "match" exists when the suffix 906 of the partial query is the same as the corresponding portion of the suffix 914 in an entry 911. For instance, referring to FIG. 10, a one letter suffix of <p> matches entries 911-3 and 911-4 having suffixes of <pot> and <pal>, respectively. An empty suffix (also called a null string) having length zero matches all entries in a query completion table, and therefore when the suffix portion of a partial query is a null string, the top N items in the table are returned as the predicted queries.

As noted above, the data structures and processes for identifying an ordered set of predicted URLs that correspond to a partial URL are the same as the data structures and processes, described above, for identifying an ordered set of predicted queries that correspond to a user entered partial query. Even though URLs and query strings may have different uses, both may be treated as a string of characters or symbols whose value may be predicted after partial entry by a user. In some embodiments, the set of "historical URLs" from which a set of URL completion tables 1234 (FIG. 12) and URL fingerprint-to-table maps 1236 (FIG. 12) are built may comprise URLs entered by a particular user or a set or community of users. In another embodiment, the set of "historical URLs" from which a set of URL completion tables and URL fingerprint to table maps are built may comprise the URLs of documents stored in a document database, such as the document database of a search engine.

Figure 11:
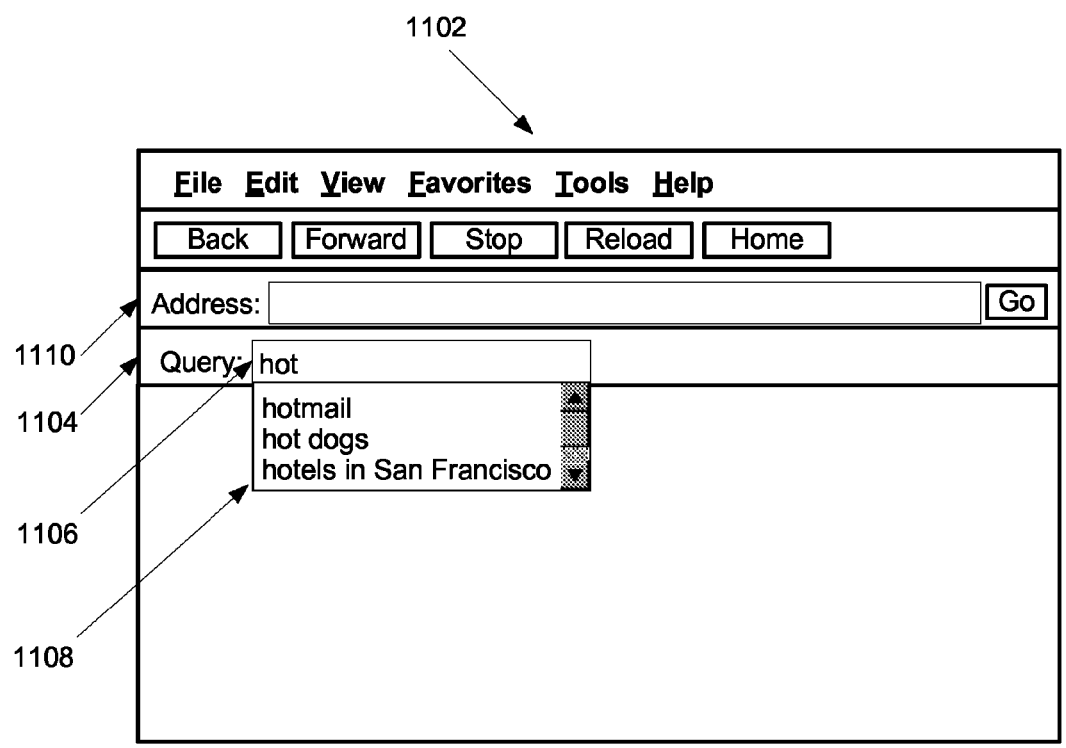
FIG. 11 depicts an exemplary screen shot in accordance with some embodiments of the present invention.

FIG. 11 illustrates a user's view when using a browser and toolbar according to some embodiments of the invention. A browser 1102 includes a toolbar 1104 including a text entry box 1106 depicting the entry of a partial query <hot>. In response to detecting the partial query and ultimately receiving the predicted queries from the query server, the predictions are displayed in display area 1108 for possible selection by the user. Similarly, while not shown, in response to detecting user entry of a partial URL in an address bar 1110, an ordered set of predicted URLs may be displayed in a display area (not shown) immediately below or adjacent the address bar 1110 for possible selection by the user.

Figure 12:
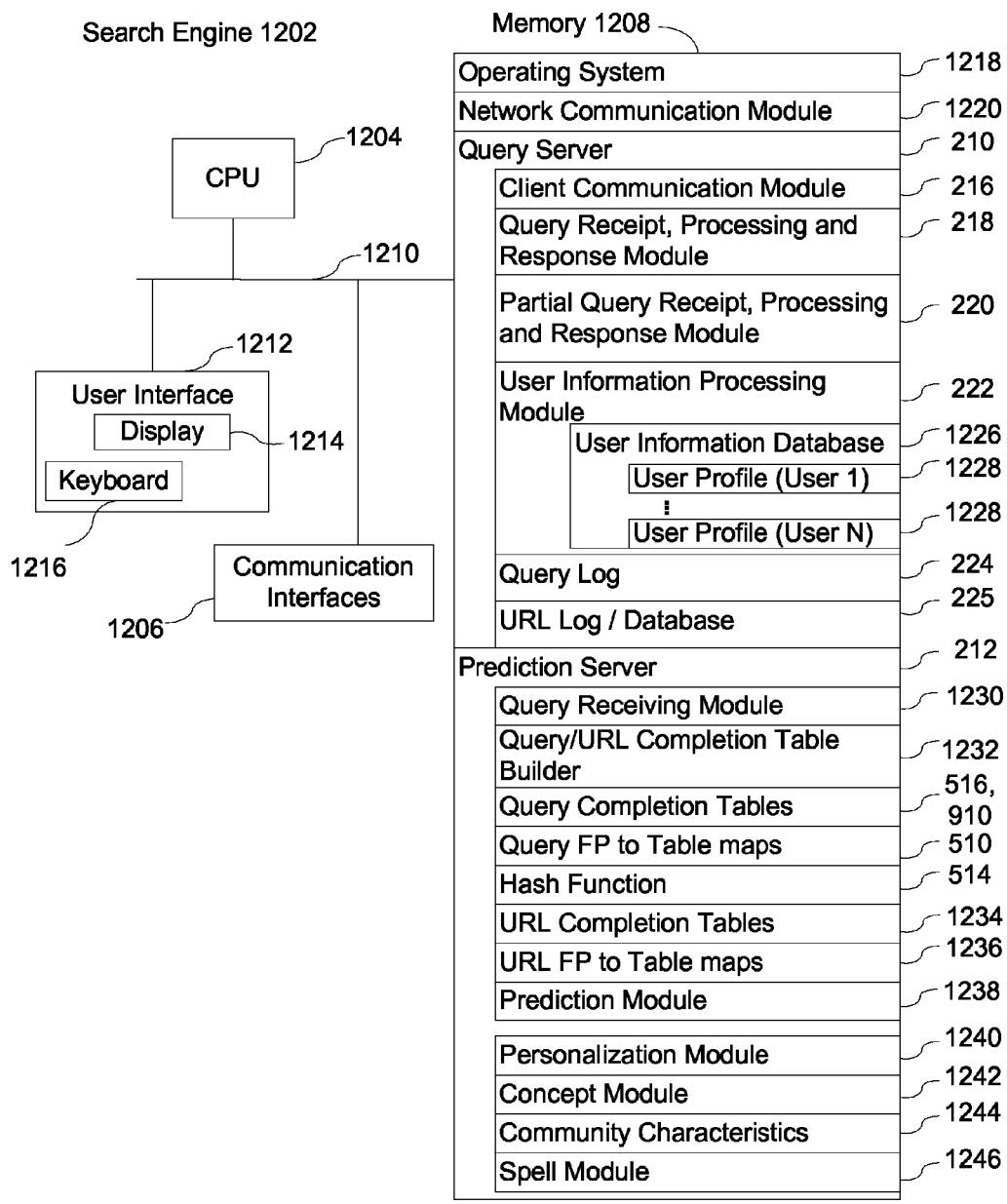
FIG. 12 depicts a search engine suitable for implementing some embodiments of the present invention.

Referring to FIG. 12, an embodiment of a search engine 1202 that implements the methods and data structures described above includes one or more processing units (CPU's) 1204, one or more network or other communications interfaces 1206, a memory 1208, and one or more communication buses 1210 for interconnecting these components. The search engine 1202 may optionally include a user interface 1212 comprising a display device 1214 and a keyboard 1216. Memory 1208 may include high speed random access memory and may also include non-volatile memory, such as one or more magnetic or optical storage disks. Memory 1208 may include mass storage that is remotely located from CPU's 1204. Memory 1208, or memory devices such non-volatile memory devices in memory 1208, may comprise a computer readable storage medium. Memory 1208 or the computer readable storage medium of memory 1208 may store the following elements, or a subset or superset of such elements:

- an operating system 1218 that includes procedures for handling various basic system services and for performing hardware dependent tasks;
- a network communication module (or instructions) 1220 that is used for connecting the search engine 1202 to other computers via the one or more communications interfaces 1206 (wired or wireless), such as the Internet, other wide area networks, local area networks, metropolitan area networks, and so on;
- a query server 210 for receiving full or partial queries and returning search results and predicted queries and predicted search results; and
- a prediction server 212 for receiving a partial query and returning a set of ordered predictions of queries or URLs.

In some embodiments, the query server 210 includes the following elements, or a subset of such elements: a client communications module 216 for receiving and transmitting information; a query receipt, processing and response module 218 for receiving and responding to full search queries; a partial query receipt, processing and response module 220 for receiving and responding to full search queries; a user information and processing module 222 for accessing user information from a user information database 1226, which includes respective user profiles 1228 for a plurality of users; a query log 224 for storing information about previously submitted queries, and a URL log or database 225. In some embodiments, the query server 210 includes a subset of these modules. In some embodiments, the query server 210 includes additional modules.

In some embodiments, the prediction server 212 includes the following elements, or a subset or superset of such elements:

- a query receiving module (or instructions) 1230 for receiving a partial query;
- a query/URL completion table builder (or instructions) 1232 for generating query completion tables 516, 910 and query fingerprint-to-table maps 510; a hash function 514; in some embodiments, the query/URL completion table builder 1232 may also generate URL completion tables 1234 and URL fingerprint-to-table maps 1236; and a prediction module (or instructions) 1238 for obtaining a set of predicted queries or URLs.

In some embodiments, the prediction server 212 may also include one or more of the following:

a personalization module (or instructions) 1240 for selecting the set of predicted queries based, at least in part, on certain user profile information;

a concept module (or instructions) 1242 for determining the concepts associated with a particular query;

a community characteristics module (or instructions) 1244 for determining a set of characteristics associated with a community of users; and a spelling module (or instructions) 1246 for identifying alternative spellings of a received query or query term.

In some embodiments, one or more of the user information processing module 222, personalization module 1240, concept module 1242, community characteristics module 1244 and spell module 1246 are not implemented. When implemented, the user profiles 1228 of the user information processing module 222 may contain information suitable for selecting or ordering predicted queries or URLs. For instance, a user profile 1228 may identify categories of information that are of interest to a particular user. A user profile 1228 may also contain information associated with a community of users to which a user belongs or with which the user is associated. The user information processing module 222 may merge personal information with the community information to generate a user profile 1228.

When implemented, the concept module 1242 may map historical queries to concepts or categories of information, suitable for matching with the information in a user profile 1228. Similarly, the concept module 1242 may be configured to map historical URLs to concepts or categories of information, for instance by determining a set of primary concepts, subjects or categories of information in the content of the documents corresponding to the historical URLs. The concept, subject or category information identified by the concept module 1242 may be stored in the entries of the query completion tables or URL completion tables, or in the query records or URL records identified by the query/URL completion tables. When processing a partial query or URL, the set of predicted queries or URLs may be reordered so that the predicted queries or URLs whose concept, subject or category information matches the information in the user profile of the requesting user are placed higher in the list of predicted queries or URLs than those predicted queries or URLs whose concept or category information does not match the information in the user profile of the requesting user.

In another embodiment, the concept module 1242 may be configured to map one or more terms in a partial query to one or more substitute terms in accordance with a conceptual or category mapping of those terms. An ordered set of predicted queries are generated for a partial query containing the one or more substitute terms, and those predicted queries are then transmitted to the user, either separately or merged with the results produced using the partial query as entered by the user.

FIG. 12 depicts the internal structure of a search engine 1202 in one embodiment. It should be understood that in some other embodiments the search engine 1202 may be implemented using multiple servers so as to improve its throughput and reliability. For instance the query log 224 could be implemented on a distinct server that communications with and works in conjunction with other ones of the servers in the search engine 1202. As another example, the query/URL completion table builder 1232 could be implemented in separate servers or computing devices (e.g., ordered set builder 242, FIG. 2).

Although the discussion herein has been made with reference to a search engine designed for use with documents remotely located from the search requestor, it should be understood that the concepts disclosed herein are equally applicable to other search environments. For example, the same techniques described herein could apply to queries against any type of information repository against which queries, or searches, are run (e.g., an address book, a product information database, a file server, a web site and so on). Accordingly, the term "search engine" should be broadly construed to encompass all such uses.

Figure 13:
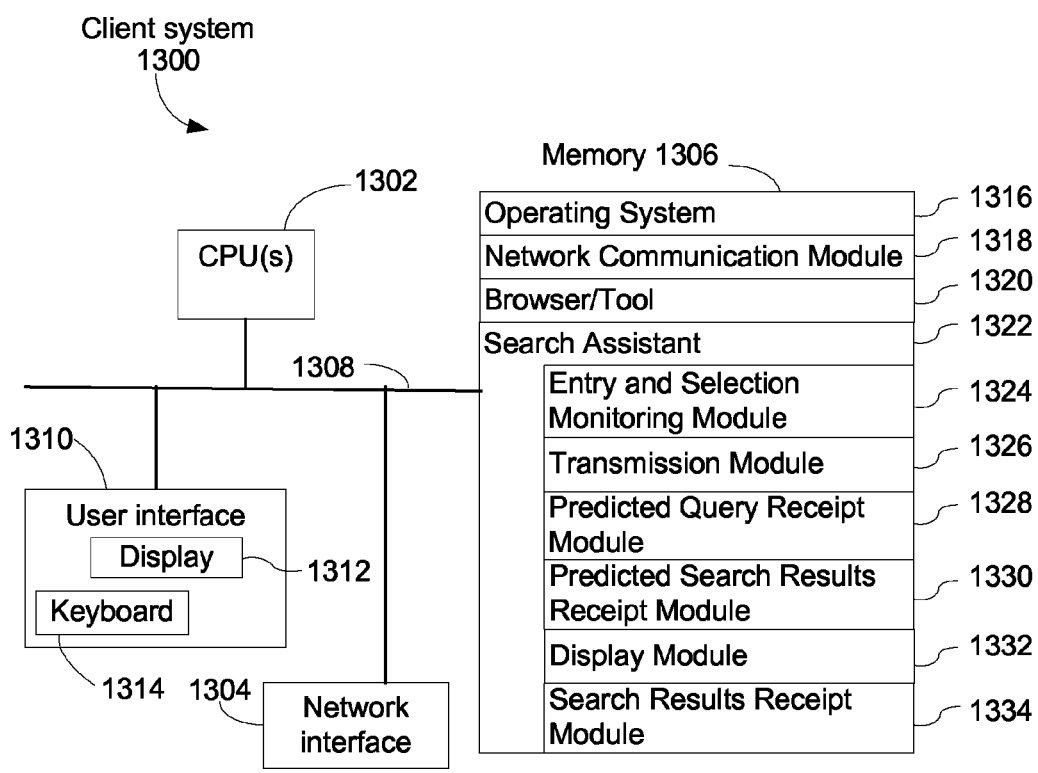
FIG. 13 depicts a client suitable for implementing some embodiments of the present invention.

Referring to FIG. 13, an embodiment of a client system 1300 that implements the methods described above includes one or more processing units (CPU's) 1302, one or more network or other communications interfaces 1304, memory 1306, and one or more communication buses 1308 for interconnecting these components. The search engine 1300 may optionally include a user interface 1310 comprising a display device 1312 and/or a keyboard 1314. Memory 1306 may include high speed random access memory and may also include non-volatile memory, such as one or more magnetic or optical storage disks. Memory 1306 may include mass storage that is remotely located from CPU's 1302. Memory 1306, or memory devices such non-volatile memory devices in memory 1306, may comprise a computer readable storage medium. Memory 1306 or the computer readable storage medium of memory 1306 may store:

an operating system 1316 that includes procedures for handling various basic system services and for performing hardware dependent tasks;

a network communication module (or instructions) 1318 that is used for connecting the client system 1300 to other computers via the one or more communications network interfaces 1304 and one or more communications networks, such as the Internet, other wide area networks, local area networks, metropolitan area networks, and so on; and a browser or tool 1320 for interfacing with a user to input search queries, and for displaying search results; and a search assistant 1322.

In some embodiments, the search assistant 1322 is separate from the browser/tool 1320, while in other embodiments the search assistant is incorporated in the browser/tool 1320.

The search assistant 1322 may include the following elements, or a subset of such elements: an entry and selection monitoring module (or instructions) 1324 for monitoring the entry of search queries and selecting partial queries for transmission to the search engine; a transmission module (or instructions) 1326 for transmitting partial search queries and final search queries to the search engine; a predicted query receipt module (or instructions) 1328 for receiving predicted queries; a predicted search results receipt module (or instructions) 1330 for receiving predicted search results; display module (or instructions) 1332 for displaying predictions and results; and optionally, a search results receipt module (or instructions) 1334 for receiving search results. The transmission of final (i.e., completed) queries, receiving search results for completed queries, and displaying such results may be handled by the browser/tool 1320, the search assistant 1322, or a combination thereof. The search assistant 1322 may also provide a corresponding set of functions for handling partial and complete URLs, which may be handled by either the same elements or a parallel set of elements as those described above. The search assistant 1322 could be implemented in many ways. For example, the search assistant 1322 could be implemented as part of a browser, as part of a toolbar, as part of a desktop application or on a web page using executable instructions (such as JavaScript). At a minimum, the search assistant transmits partial query information to a search system. The search assistant may also enable the display of predicted results and user selection of a displayed predicted result.

Although illustrated in FIGS. 12 and 13 as distinct modules or components, the various modules or components may be located or co-located within either the search engine or the client. For example, in some embodiments, portions of prediction server 212, and/or the various query completion tables 516 and/or 910 are resident on the client system 202 or form part of the search assistant 204. For example, in some embodiments query completion tables and fingerprint-to-table maps for the most popular searches may be periodically downloaded to a client system 202, thereby providing fully client-based query or URL input prediction for at least some partially input queries or URLs.

In another embodiment, the search assistant 204 may include a local version of the prediction server 212, for making search or URL predictions based at least in part on prior searches and URL entries of the user. Alternately, or in addition, the local prediction server 212 may generate predictions based on data downloaded from a search engine or remote prediction server. Further, the client assistant 204 may merge locally generated and remotely generated prediction sets for presentation to the user. The results could be merged in any of a number of ways, for example, by interleaving the two sets or by merging the sets while biasing queries previously submitted by the user such that those queries would tend to be placed or inserted toward the top of the combined list of predicted queries. In some embodiments, the client assistant 204 inserts queries deemed important to the user into the set of predictions. For example, a query frequently submitted by the user, but not included in the set obtained from the search engine could be inserted into the predictions.

Although some of various drawings illustrate a number of logical stages in a particular order, stages which are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method for processing query information, comprising:
   at a client system:
   receiving a partial search query from a user;
   prior to receiving a search request from the user on a complete search query that includes the partial search query, sending the partial search query to a server system;
   receiving from the server system, a set of historical complete search queries, the set of historical complete search queries corresponding to the partial search query and ordered in accordance with a ranking criterion;
   receiving from the server system, prior to receiving a user selection of one of the set of historical complete search queries receiving from the server system, predicted search results corresponding to one or more search queries of the set of historical complete search queries; and
   displaying at least a subset of the set of historical complete search queries and at least a subset of the predicted search results.

2. The method of claim 1, further comprising:
   generating, at the client, a local set of historical complete search queries, the local set of historical complete search queries corresponding to the partial search query.

3. The method of claim 2, further comprising:
   merging the local set of historical complete search queries with the set of historical complete search queries.

4. The method of claim 2, wherein the local set of historical complete search queries includes a query frequently submitted by the user which is not contained in the set of historical complete search queries received from the server system.

5. The method of claim 1, wherein the predicted search results are received prior to receiving from the user the search request on the complete search query that includes the partial search query.

6. The method of claim 1, further comprising formatting the subset of the predicted search results and the subset of the historical complete search queries are for display in single display window.

7. The method of claim 1, wherein the predicted search results correspond to a predicted search query associated with subjects, concepts, or categories of information that are of interest to the user.

8. The method of claim 1, wherein the predicted search results correspond to a predicted search query previously submitted by the user.

9. The method of claim 1, further comprising:
   displaying the subset of the predicted search results in a portion of a non-persistent window.

10. The method of claim 1, further comprising:
    displaying the subset of the set of historical complete search queries in a display area near the partial search query.

11. A client system, for processing query information, comprising:
    one or more processors; and
    memory storing one or more programs to be executed by the one or more processors;
    the one or more programs comprising instructions for:
    receiving a partial search query from a user;
    prior to receiving a search request from the user on a complete search query that includes the partial search query, sending the partial search query to a server system;
    receiving from the server system, a set of historical complete search queries, the set of historical complete search queries corresponding to the partial search query and ordered in accordance with a ranking criterion;
    receiving from the server system, prior to receiving a user selection of one of the set of historical complete search queries, predicted search results corresponding to one or more search queries of the set of historical complete search queries; and displaying at least a subset of the set of historical complete search queries and at least a subset of the predicted search results.

12. The system of claim 11, wherein the one or more programs further comprise instructions for generating, at the client, a local set of historical complete search queries, the local set of historical complete search queries corresponding to the partial search query.

13. The system of claim 12, wherein the one or more programs further comprise instructions for merging the local set of historical complete search queries with the set of historical complete search queries.

14. The system of claim 12, wherein the local set of historical complete search queries includes a query frequently submitted by the user which is not contained in the set of historical complete search queries received from the server system.

15. The system of claim 11, wherein the predicted search results are received prior to receiving from the user the search request on the complete search query that includes the partial search query.

16. The system of claim 11, wherein the predicted search results correspond to a predicted search query associated with subjects, concepts, or categories of information that are of interest to the user.

17. The system of claim 11, wherein the one or more programs further comprise instructions for formatting the subset of the predicted search results and the subset of the historical complete search queries are for display in single display window.

18. A non-transitory computer readable storage medium storing one or more programs configured for execution by a computer, the one or more programs comprising instructions for:
receiving a partial search query from a user;
prior to receiving a search request from the user on a complete search query that includes the partial search query, sending the partial search query to a server system;
receiving from the server system, a set of historical complete search queries, the set of historical complete search queries corresponding to the partial search query and ordered in accordance with a ranking criterion;
receiving from the server system, prior to receiving a user selection of one of the set of historical complete search queries, predicted search results corresponding to one or more search queries of the set of historical complete search queries; and
displaying at least a subset of the set of historical complete search queries and at least a subset of the predicted search results.

19. The non-transitory computer readable storage medium of claim 18, wherein the one or more programs further comprise instructions for generating, at the client, a local set of historical complete search queries, the local set of historical complete search queries corresponding to the partial search query.

20. The non-transitory computer readable storage medium of claim 19, wherein the one or more programs further comprise instructions for merging the local set of historical complete search queries with the set of historical complete search queries.

21. The non-transitory computer readable storage medium of claim 19, wherein the local set of historical complete search queries includes a query frequently submitted by the user which is not contained in the set of historical complete search queries received from the server system.

22. The non-transitory computer readable storage medium of claim 18, wherein the predicted search results are received prior to receiving from the user the search request on the complete search query that includes the partial search query.

23. The non-transitory computer readable storage medium of claim 18, wherein the predicted search results correspond to a predicted search query associated with subjects, concepts, or categories of information that are of interest to the user.

24. The non-transitory computer readable storage medium of claim 18, wherein the one or more programs further comprise instructions for formatting the subset of the predicted search results and the subset of the historical complete search queries are for display in single display window.

* * * * *

UNITED STATES PATENT AND TRADEMARK OFFICE
CERTIFICATE OF CORRECTION

PATENT NO. : 8,515,954 B2  Page 1 of 1
APPLICATION NO. : 13/218416
DATED : August 20, 2013
INVENTOR(S) : Kevin A. Gibbs et al.

It is certified that error appears in the above-identified patent and that said Letters Patent is hereby corrected as shown below:

On the Title Page, Item (75) Inventors, line 2, please delete "Karnvar" and insert -- Kamvar --

Signed and Sealed this
Twenty-ninth Day of October, 2013

Teresa Stanek Rea
*Deputy Director of the United States Patent and Trademark Office*